(12) United States Patent
Shields et al.

(10) Patent No.: US 7,472,098 B2
(45) Date of Patent: Dec. 30, 2008

(54) SYSTEM AND METHOD FOR EXECUTION OF TRADES MADE PURSUANT TO STOCK OPTION AND PURCHASE PLANS

(75) Inventors: Lawrence P. Shields, New York, NY (US); Amod Bhargava, Belle Mead, NJ (US); Keith Carsten, Danville, CA (US); George Brewster, San Jose, CA (US); James A. Humza, Skillman, NJ (US); Robert H. Maurer, Levittown, NY (US); Michael Cranor, Weehawken, NJ (US); James P. Mooney, River Vale, NJ (US)

(73) Assignee: UBS Financial Services, Inc., Weehawken, NJ (US)

(*) Notice: Subject to any disclaimer, the term of this patent is extended or adjusted under 35 U.S.C. 154(b) by 1321 days.

(21) Appl. No.: 09/779,114

(22) Filed: Feb. 8, 2001
(Under 37 CFR 1.47)

(65) Prior Publication Data

US 2002/0032636 A1 Mar. 14, 2002

Related U.S. Application Data

(60) Provisional application No. 60/182,399, filed on Feb. 14, 2000.

(51) Int. Cl.
*G06Q 40/00* (2006.01)
(52) U.S. Cl. .............................. 706/36; 705/35; 705/37
(58) Field of Classification Search .................. 705/37, 705/36 R, 35, 36
See application file for complete search history.

(56) References Cited

U.S. PATENT DOCUMENTS

| | | | |
|---|---|---|---|
| 4,346,442 A | 8/1982 | Musmanno | |
| 4,376,978 A | 3/1983 | Musmanno | |
| 4,566,066 A | 1/1986 | Towers | |
| 4,597,046 A | 6/1986 | Musmanno et al. | |
| 4,648,037 A | 3/1987 | Valentino | |
| 4,674,044 A | 6/1987 | Kalmus et al. | |
| 4,751,640 A | 6/1988 | Lucas et al. | |
| 4,774,663 A | 9/1988 | Musmanno et al. | |
| 4,823,265 A | 4/1989 | Nelson | |
| 4,953,085 A | 8/1990 | Atkins | |
| 4,989,141 A | 1/1991 | Lyons et al. | |
| 4,994,964 A | 2/1991 | Wolfberg et al. | |
| 5,126,936 A | 6/1992 | Champion et al. | |
| 5,132,899 A | 7/1992 | Fox | |
| 5,193,056 A | 3/1993 | Boes | |
| 5,210,687 A | 5/1993 | Wolfberg et al. | |
| 5,214,579 A | 5/1993 | Wolfberg et al. | |
| 5,227,967 A | 7/1993 | Bailey | |

(Continued)

OTHER PUBLICATIONS

Joffrion, Levy, Employee Stock Ownership Plans, AutoInc Magazine, vol. XIVII, Jul. 1999, entire document.

*Primary Examiner*—Jagdish N Patel
(74) *Attorney, Agent, or Firm*—Proskauer Rose LLP

(57) ABSTRACT

A system and method for inquiry of option and/or stock status and for processing trades made pursuant to stock option and purchase plans is provided. Participant information is stored and transmitted to a finance system. Rules may be enforced for stock option and stock purchase plans with the finance system. Participants are provided with incentive compensation that can be utilized in a simplified, user friendly, streamlined process.

15 Claims, 24 Drawing Sheets

U.S. PATENT DOCUMENTS

| | | |
|---|---|---|
| 5,233,514 A | 8/1993 | Ayyoubi et al. |
| 5,262,942 A | 11/1993 | Earle |
| 5,592,379 A | 1/1997 | Finfrock et al. |
| 5,631,828 A | 5/1997 | Hagan |
| 5,644,727 A | 7/1997 | Atkins |
| 5,671,363 A * | 9/1997 | Cristofich et al. ............. 705/37 |
| 5,692,233 A | 11/1997 | Garman |
| 5,758,097 A | 5/1998 | Debe et al. |
| 5,774,880 A | 6/1998 | Ginsberg |
| 5,775,734 A | 7/1998 | George, Jr. |
| 5,802,500 A | 9/1998 | Ryan et al. |
| 5,832,461 A | 11/1998 | Leon et al. |
| 5,852,811 A | 12/1998 | Atkins |
| 5,857,176 A | 1/1999 | Ginsberg |
| 5,864,828 A | 1/1999 | Atkins |
| 5,884,285 A | 3/1999 | Atkins |
| 5,991,744 A * | 11/1999 | DiCresce ................. 705/36 R |
| 6,154,732 A | 11/2000 | Tarbox |
| 6,173,270 B1 | 1/2001 | Cristofich et al. |
| 6,235,176 B1 * | 5/2001 | Schoen et al. ................... 705/4 |
| 6,571,219 B1 * | 5/2003 | Spivey ..................... 705/36 R |

* cited by examiner

| XXXXXXXXXX | CORPORATE EMPLOYEE FINANCE SERVICES |

EMPLOYEE ID: [ * * * * * ]

PIN: [ * * * ]

[ SUBMIT ]  [ RESET ]

*FIG. 3*

┌─────────────────────────────────────────────────────────────┐
│  ┌──────────────────┐   CORPORATE EMPLOYEE FINANCE SERVICES   │
│  │ XXXXXXXXXXXXXX   │   HOME   GRANT INFORMATION   TRADE SUMMARY   ORDER ENTRY │
│  └──────────────────┘   QUOTE   STATEMENTS   FORMS   HELP   LOG OUT │
│                                                             │
│  CURRENT QUOTE                                          │
│                                                             │
│         PRESENTLY, XXXXXXXXXX STOCK IS TRADING AT THE NEW YORK STOCK EXCHANGE │
│  163 →  AT 31.5, DOWN -1.4375. THE DOW JONES INDUSTRIAL AVERAGE IS CURRENTLY AT │
│         8192.48, UP +500.32. WARNING!! MARKET SHIFT!        │
│                                                             │
│  OPTIONEE INFORMATION                                   │
│                                                             │
│       SSN/ID:        0017851                                │
│       LAST NAME:     WOODBRIDGE, JR                         │
│       FIRST NAME:    JOHN M                                 │
│       ADDRESS:       1705 OCEAN PARKWAY                     │
│                      NEW YORK, NY 10003                     │
│       WORK PHONE:    2124685555                             │
│       HOME PHONE:    2124458888                             │
│       PW ACCOUNT NO: FN30898                                │
│       FORM ON FILE:  YES                                    │
│                                                             │
│       ┌──────────────────────┐                              │
│       │ CHANGE PHONE NUMBERS │                              │
│       └──────────────────────┘                              │
└─────────────────────────────────────────────────────────────┘

*FIG. 4*

| | CORPORATE EMPLOYEE FINANCE SERVICES | | |
|---|---|---|---|
| XXXXXXXXXXXXXX | HOME   GRANT INFORMATION   TRADE SUMMARY | | ORDER ENTRY |
| | QUOTE   STATEMENTS   FORMS   HELP | | LOG OUT |

ACCOUNT AUTHORIZATION FORMS

| AUTHORIZATION FORM | MS WORD 97 FORMAT |
|---|---|
| INTERNATIONAL ACCOUNT AUTHORIZATION FORM | N/A |
| ACCOUNT AUTHORIZATION FORM | AVAILABLE |

| HOME | GRANT INFORMATION | TRADE SUMMARY | ORDER ENTRY | QUOTE | STATEMENTS | FORMS | HELP | LOG OUT |

*FIG. 5*

| | CORPORATE EMPLOYEE FINANCE SERVICES | | | |
|---|---|---|---|---|
| XXXXXXXXXXXXXX | HOME  GRANT INFORMATION  TRADE SUMMERY  ORDER ENTRY | | | |
| | QUOTE  STATEMENTS  FORMS  HELP  LOG OUT | | | |

ORDER ENTRY

| GRANT NUMBER | GRANT DATE | OPTION PRICE | EXERCISABLE SHARES | SHARES TO BE SOLD |
|---|---|---|---|---|
| N01541 ☑ | 01/26/1990 | $8.21 | 15,300 | 200 |
| N01814 ☐ | 01/24/1991 | $9.4 | 36,000 | |
| N02178 ☐ | 01/23/1992 | $8.75 | 36,000 | |
| N00022 ☐ | 04/15/1993 | $13.69 | 44,000 | |
| N02553 ☐ | 01/27/1994 | $17.66 | 32,000 | |
| N04936 ☐ | 01/25/1995 | $17.82 | 32,000 | |
| | | TOTAL QUANTITY: | 195,300 | |

ORDER TYPE: LIMIT  PRICE: 75

DURATION: GTC

PROCEEDS: ACCOUNT

[REVIEW ORDER]  [CLEAR ORDER]

| HOME | GRANT INFORMATION | TRADE SUMMARY | ORDER ENTRY | QUOTE | STATEMENTS | FORMS | HELP | LOG OUT |

*FIG. 14*

400
┌─────────────────────────────────────────────────────────────┐
│                  CORPORATE EMPLOYEE FINANCE SERVICES        │
│ XXXXXXXXXXXXX  HOME  GRANT INFORMATION  TRADE SUMMERY  ORDER ENTRY │
│                QUOTE   STATEMENTS   FORMS   HELP   LOG OUT  │
│ REVIEW ORDER                                                │
│      PLEASE CONFIRM THE FOLLOWING ORDER:                    │
│  402  LIMIT GTC ORDER                                       │
│       AT A LIMIT PRICE OF 60                                │
│       TO SELL                                               │
│                                                             │
│       200 SHARES FROM N01541 GRANT,                         │
│       GRANTED ON 01/26/1990,                                │
│       FOR AN OPTION PRICE OF 8.21                           │
│                                                             │
│  404  [ SUBMIT ORDER ]                                      │
│                                                             │
│ | HOME | GRANT INFORMATION | TRADE SUMMARY | ORDER ENTRY | QUOTE | STATEMENTS | FORMS | HELP | LOG OUT | │
└─────────────────────────────────────────────────────────────┘

*FIG. 15*

CANCEL ORDER

412 — YOU ARE CANCELING FN5043 ORDER WITH OPEN QUANTITY 200 SHARES, WHICH WAS PLACED 02/06/1998 AT 10:19:58 AS GTC WITH PRICE $75 PER SHARE. LIMIT PRICE FOR THIS ORDER IS $75 PER SHARE AND THE GTC EXPIRATION DATE IS 03/06/1998.

PLEASE CHOOSE ONE FROM THE FOLLOWING OPTIONS:

410 ⊙ FULL CANCEL
414 ○ CANCEL REPLACE    NEW PRICE: $ ☐

NOTE: IF YOU CHOOSE "CANCEL REPLACE" OPERATION, PLEASE MAKE SURE TO SPECIFY THE NEW PRICE.

[ INITIATE CANCELLATION ]  [ RESET ]
         416              418

| HOME | GRANT INFORMATION | TRADE SUMMARY | ORDER ENTRY | QUOTE | STATEMENTS | FORMS | HELP | LOG OUT |

*FIG. 16*

| XXXXXXXXXXXXX | CORPORATE EMPLOYEE FINANCE SERVICES | | | |
|---|---|---|---|---|
| | HOME | GRANT INFORMATION | TRADE SUMMERY | ORDER ENTRY |
| | QUOTE | STATEMENTS | FORMS HELP | LOG OUT |

GRANT INFORMATION (DETAILED)

| GRANT NUMBER | GRANT DATE | GRANT PRICE | OPTION TYPE | OPTIONS GRANTED | OPTIONS EXERCISED | OPTIONS EXERCISABLE |
|---|---|---|---|---|---|---|
| 100145 | 01/23/1986 | $8.92 | ISO | 12,008 | 12,000 | 0 |

420 →

| EXERCISE DATE | OPTION PRICE | SHARES EXERCISED | SALES PRICE | COMMISSIONS | COST OF GRANT |
|---|---|---|---|---|---|
| 12/09/1992 | $8.92 | 7,200 | 0 | 0 | $64224 |
| 09/02/1987 | $8.92 | 4,800 | 0 | 0 | $42896 |

| HOME | GRANT INFORMATION | TRADE SUMMARY | ORDER ENTRY | QUOTE | STATEMENTS | FORMS | HELP | LOG OUT |

*FIG. 17*

|  | | CORPORATE EMPLOYEE FINANCE SERVICES | | | |
|---|---|---|---|---|---|
| XXXXXXXXXXXXXX | HOME | GRANT INFORMATION | TRADE SUMMERY | | ORDER ENTRY |
|  | QUOTE | STATEMENTS | FORMS | HELP | LOG OUT |

TRADE SUMMARY

| CANCEL ORDER | SEQUENCE NUMBER | ENTRY DATE | QUANTITY | STATUS | ORDER TYPE | PRICE | EXECUTION DATE |
|---|---|---|---|---|---|---|---|
| CANCEL | FA5043 | 02/06/1998 | 200 | OPN | GTC | N/A | N/A |
|  | FA5042 | 02/05/1998 | 200 | EXE | GTC | $60 | 02/05/1998 |
|  | FA5041 | 02/05/1998 | 100 | EXE | MKT | $10 | 02/05/1998 |
|  | FA5030 | 02/04/1998 | 100 | PCXL | DAY | N/A | N/A |
|  | FA5029 | 02/04/1998 | 100 | EXE | DAY | $56 | 02/04/1998 |

424 → (points to CANCEL row)

| HOME | GRANT INFORMATION | TRADE SUMMARY | ORDER ENTRY | QUOTE | STATEMENTS | FORMS | HELP | LOG OUT |

*FIG. 18*

| | CORPORATE EMPLOYEE FINANCE SERVICES | | | |
|---|---|---|---|---|
| XXXXXXXXXXXXX | HOME | GRANT INFORMATION | TRADE SUMMERY | ORDER ENTRY |
| | QUOTE | STATEMENTS | FORMS HELP | LOG OUT |

TRADE SUMMARY (DETAILED)

| SEQUENCE NUMBER | DATE | TIME | STATUS | ORDER TYPE | OPEN QUANTITY | PRICE | CUMULATIVE EXECUTED |
|---|---|---|---|---|---|---|---|
| FA5042 | 02/05/1998 | 15:10:07 | EXE | GTC | 200 | 60 | 0 |
| | 02/05/1998 | 15:11:19 | EXE | GTC | 0 | 60 | 200 |

426 →

| HOME | GRANT INFORMATION | TRADE SUMMARY | ORDER ENTRY | QUOTE | STATEMENTS | FORMS | HELP | LOG OUT |

*FIG. 19*

|  | CORPORATE EMPLOYEE FINANCE SERVICES | | | |
|---|---|---|---|---|
| XXXXXXXXXXXXXX | HOME  GRANT INFORMATION | TRADE SUMMERY | | ORDER ENTRY |
|  | QUOTE  STATEMENTS | FORMS | HELP | LOG OUT |

ORDER CONFIRMATION

PLEASE RECORD THE FOLLOWING INFORMATION ABOUT YOUR ORDER:

430 → YOUR ORDER HAS BEEN SENT TO THE EXCHANGE.
THE ORDER REFERENCE NUMBER IS FA5044.
PLEASE RECORD THIS NUMBER FOR THE FUTURE REFERENCE.

| HOME | GRANT INFORMATION | TRADE SUMMARY | ORDER ENTRY | QUOTE | STATEMENTS | FORMS | HELP | LOG OUT |

*FIG. 20*

|  | CORPORATE EMPLOYEE FINANCE SERVICES | | | |
|---|---|---|---|---|
| XXXXXXXXXXXXXX | HOME | GRANT INFORMATION | TRADE SUMMERY | ORDER ENTRY |
|  | QUOTE | STATEMENTS | FORMS HELP | LOG OUT |

CANCEL ORDER CONFIRMATION

PLEASE CONFIRM THE FOLLOWING INFORMATION:

432 — YOU WISH TO PERFORM FULL CANCELATION OPERATION TO THE GTC ORDER FN5043 WHICH WAS PLACED 02/06/1998 AT 10:19:58 WITH QUANTITY OF 200 SHARES AND PRICE $75 PER SHARE. LIMIT PRICE FOR THIS ORDER IS $75. THIS ORDER EXPIRES 03/06/1998.

IF YOU ARE AGREE WITH ABOVE INFORMATION, PLEASE PRESS CONFIRM BUTTON.
YOU MAY PRESS BACK BUTTON ON THE TOP OF YOUR BROWSER AND AVOID THIS EXECUTION.

[CONFIRM]   [CANCEL]
   434          436

| HOME | GRANT INFORMATION | TRADE SUMMARY | ORDER ENTRY | QUOTE | STATEMENTS | FORMS | HELP | LOG OUT |

*FIG. 21*

| XXXXXXXXXXXXX | CORPORATE EMPLOYEE FINANCE SERVICES | | | |
|---|---|---|---|---|
| | HOME   GRANT INFORMATION | TRADE SUMMERY | | ORDER ENTRY |
| | QUOTE   STATEMENTS | FORMS | HELP | LOG OUT |

CANCEL ORDER CONFIRMATION

YOUR REQUEST WAS PERFORMED SUCCESSFULLY.
ORDER FN5043 WAS SENT FOR CANCELLATION.
PLEASE REFLECT IT IN YOUR RECORDS.

| HOME | GRANT INFORMATION | TRADE SUMMARY | ORDER ENTRY | QUOTE | STATEMENTS | FORMS | HELP | LOG OUT |

| XXXXXXXXXXXXX | CORPORATE EMPLOYEE FINANCE SERVICES | | | |
|---|---|---|---|---|
| | HOME | GRANT INFORMATION | TRADE SUMMERY | ORDER ENTRY |
| | QUOTE | STATEMENTS | FORMS | HELP | LOG OUT |

UPDATING OPTIONEE INFORMATION

SSN/ID: 0017851
LAST NAME: WOODBRIDGE, JR
FIRST NAME: JOHN M
ADDRESS: 1705 OCEAN PARKWAY
NEW YORK, NY 10003
WORK PHONE: [2124685558]
HOME PHONE: [2124458886]
PW ACCOUNT NO: FN30898
FORM ON FILE: YES

[ SUBMIT CHANGES ]   [ RESET ]

| HOME | GRANT INFORMATION | TRADE SUMMARY | ORDER ENTRY | QUOTE | STATEMENTS | FORMS | HELP | LOG OUT |

SYSTEM AND METHOD FOR EXECUTION OF TRADES MADE PURSUANT TO STOCK OPTION AND PURCHASE PLANS

CROSS REFERENCE TO RELATED APPLICATIONS

This application claims the benefit of U.S. Ser. No. 60/182,399, filed Feb. 14, 2000.

BACKGROUND OF THE INVENTION

1. Field of the Invention

The present invention relates to financial business systems; and more particularly to a system and method for inquiry and processing of trades made pursuant to employee stock option and purchase plans.

2. Description of the Prior Art

In recent years, employee stock ownership through stock option and purchase plans has become a popular form of incentive compensation. Stock ownership provides an opportunity for employees to share in the growth potential of a company, thereby creating work incentives. Stock option and purchase plans are easy for the sponsoring company to establish, primarily because they do not require any financial targets. They also offer numerous other advantages to employees and employers alike. For example, stock ownership provides the ability to realize unlimited gains. Ownership can also be tailored to specifically benefit those employees whose actions impact the stock value. For employers, stock ownership enables a company to attract and keep talented employees without draining cash reserves to pay high salaries.

A stock option is a right granted by a company to an employee to purchase a fixed number of shares of stock at specified price and within a specific period of time. With stock options plans, eligible employees are granted stock options that when vested can be exercised and held or sold without an initial investment. The decision to exercise stock options depends on a number of factors, including the value of the underlying stock, taxes, timing and employee financial circumstances. Like stock options, stock purchase plans afford a method for employees to purchase company stock, through payroll deductions or otherwise. Employers purchase company stock for participating employees, usually two times per year, based on the money accumulated for the participating employee up to that time.

There has been a recognition that computer-based financial systems can be used to automate the stock option exercise process. U.S. Pat. No. 4,823,265 to Nelson discloses a system and method for processing transactions in renewable options in stocks and other securities using a computer-based system. The system provides for the automatic renewal of options for a fixed term, until a designated event occurs, or perpetually. U.S. Pat. No. 5,671,363 to Cristofich et al. is directed to a data processing system for administration of stock option accounts that manages and tracks a plurality of individual accounts, current stock pricing, individual biographic data, company option plans and current withholding and other tax requirements. The system exercises select options pursuant to a specific participant request or the happening of an event, such as the market obtaining a participant selected target price for a security. The system accomplishes this task by real-time access to participant information pertaining to present or future stock option rights. Once exercise is effectuated, the system bundles the individual transactions across multiple participants and sends this to the exchange as a single security transaction. The system uses a corresponding brokerage account held in the participant's name to implement the actual trades of stock necessary for option exercise.

Neither the Nelson nor the Cristofich et al. systems are capable of processing trades made pursuant to both company sponsored stock option and stock purchase plans. In addition, these are complicated systems, requiring substantial means to support the automatic processing of option transactions upon the happening of a specific event.

There remains a need in the art for a simplified system for inquiring on the status of and trading stocks acquired pursuant to employee stock option and purchase plans, which does not require a concomitant full-service brokerage account or real-time access to employee demographic information.

SUMMARY OF THE INVENTION

In accordance with the present invention, there is provided a system for inquiry and processing of trades made pursuant to at least one of a stock option and a stock purchase plan, the system comprising a finance system for automatic processing of a transaction pursuant to at least one of the stock option plan and the stock purchase plan, the finance system including a volatile data storage for storing participant information pursuant to a data transfer from a nonvolatile database of a third party administration system; an interface system for interacting with a participant regarding a requested transaction; a trading system for conducting individual participant transactions on a public exchange; and a communication system that connects a participant to the finance system. The communication system comprises conventional access technology such as an interactive voice response system (i.e., a telephone interface), or an Internet or Intranet interface. In addition, the system allows participant employees to exercise, hold and/or sell stock via a number of different vehicles, including cash, cashless, sell to cover or stock swap. As such, the system can be readily adapted to the needs of different participants. Advantageously, the system of the present invention does not require a concomitant full-service brokerage account, and does not require real-time access to employee demographic information. In this way, the system can accommodate an unlimited number of participants and sponsoring employers.

The present invention also provides a method for automatically processing transactions made pursuant to at least one of a stock option plan and a stock purchase plan, the method comprising the steps of: storing participant information in a nonvolatile database of an administration system; transmitting the participant information to a volatile data storage of a finance system; implementing transactions with the finance system; and transmitting updateable transaction information to the nonvolatile database of the administration system. In accordance with the method described herein, employers can provide employees with incentive compensation that can be utilized in a simplified, user friendly and streamlined process.

Also provided by the present invention is a finance system for automatic processing of a transaction pursuant to at least one of a stock option plan and a stock purchase plan, the finance system comprising: a volatile data storage for storing participant information pursuant to a data transfer from a non-resident, nonvolatile database; an interface system for interacting with a participant regarding a requested transaction; and a rule system for processing transactions with a trading system in accordance with at least one set of transaction rules. Advantageously, the system can be customized to accommodate any number of different stock option and/or purchase plans offered by employers.

BRIEF DESCRIPTION OF THE DRAWINGS

The invention will be more fully understood and further advantages will become apparent when reference is made to the following detailed description of the preferred embodiments of the invention and the accompanying drawings in which:

FIG. 3 is a display illustrating a log-in of a Web-based interface system;

FIG. 4 is a display of a Web-based interface system illustrating a market warning;

FIG. 5 is a display of a Web-based interface system illustrating an authorization form request window;

FIG. 14 is a display of a Web-based interface system for an order entry;

FIG. 15 is a display of a Web-based interface system for reviewing an order;

FIG. 16 is a display of a Web-based interface system for canceling an order;

FIG. 17 is a display of a Web-based interface system for providing grant information;

FIG. 18 is a display of a Web-based interface system for providing trade summary;

FIG. 19 is a display of a Web-based interface system for providing detailed trade summary;

FIG. 20 is a display of a Web-based interface system for order confirmation;

FIG. 21 is a display of a Web-based interface system for cancel order confirmation;

FIG. 22 is a display of a Web-based interface system for cancel order confirmation; and FIG. 23 is a display of a Web-based interface system for updating optionee information.

DETAILED DESCRIPTION OF THE INVENTION

The present invention relates to an interactive computerized system for automating the processes and procedures common to inquiry of option and/or stock status and execution of trades made pursuant to employee stock option and purchase plans. It provides participants with the ability to view stock option and purchase account information, issue orders and receive proceeds. In accordance with the system, employers can provide employees with incentive compensation that can be utilized by means of a simplified, user friendly and streamlined process.

Generally stated, the present invention provides a system for inquiry and processing of trades made pursuant to at least one of a stock option and a stock purchase plan, the system comprising a finance system for automatic processing of a transaction pursuant to at least one of the stock option plan and the stock purchase plan, the finance system including a volatile data storage for storing participant information pursuant to a data transfer from a nonvolatile database of a third party administration system; an interface system for interacting with a participant regarding a requested transaction; a trading system for conducting individual participant transactions on a public exchange; and a communication system that connects a participant to the finance system.

Figure 1:
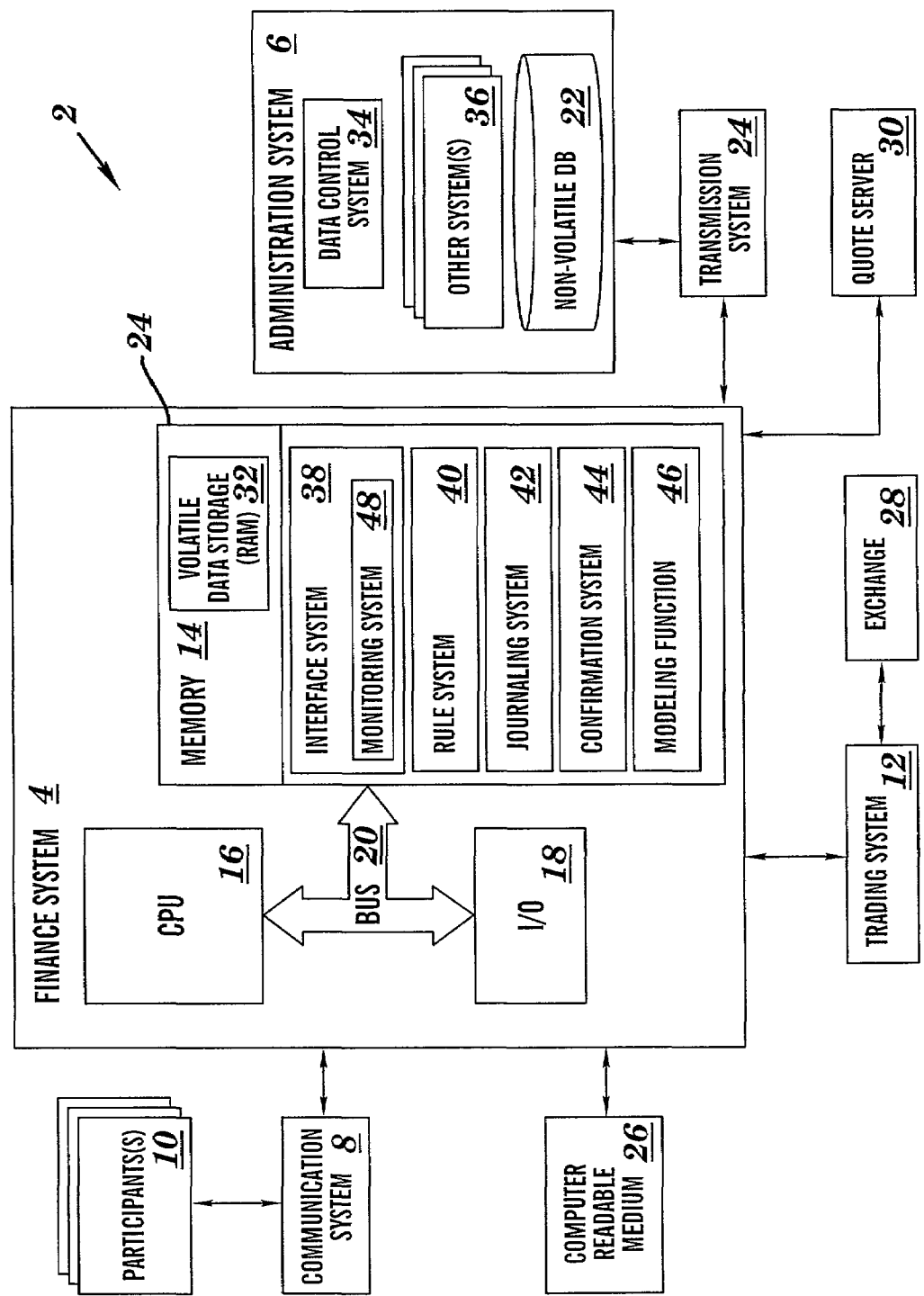
FIG. 1 is a block diagram depicting the functional components of the present system.

FIG. 1 illustrates a stock option and purchase plan system 2. Stock option and purchase plan system 2 comprises a finance system 4, a communication system 8 that connects a participant 10 to finance system 4 and a trading system 12 for the trading of individual transactions on a public exchange 28. Also shown with system 2 is a third party administration system 6, which will be further defined below. Finance system 4 serves as a central processing component and as an interface for other peripheral components relative to stock option and stock purchase plan transactions. Third party administration system 6 serves as an interface for a client (e.g., corporate employer) and participants (e.g., an employer's employees) relative to establishing an entity as a client or participant, inputting and updating client or participant information, tracking participant accounts, and other administrative functions. As discussed in detail later, nonvolatile database 22 resident in third party administration system 6 houses participant particulars and client information. Thus, as used herein, nonvolatile database 22 refers to information storage which is not resident in finance system 4, and is not of a transient nature. It should be noted that administration system 6 does not constitute a part of the present invention. Any description relative to administration system 6 is provided for clarity of understanding of system 2.

One with skill in the art will recognize that while finance system 4 and administration system 6 are separate systems, they may have fairly similar operative structure, i.e., hardware. For instance, finance system 4 preferably includes a memory 14, a CPU 16, an input/output device (I/O) 18 and a bus 20. Systems 4 and 6 may also, of course, include nonvolatile data storage such as a nonvolatile database 22 of administration system 6.

Within each system 4, 6, memory may comprise any known or hereafter developed type of data storage system and/or transmission media, including magnetic media, optical media, random access memory (RAM), read only memory (ROM), a data object, and the like. Memory may reside at a single physical location comprising one or more types of data storage, or be distributed across a plurality of physical systems. Each respective CPU may likewise comprise a single processing unit, or a plurality of processing units distributed across one or more locations, e.g., on a client and server. Each respective I/O may comprise any known or hereafter developed type of input/output device including a network system, modem, keyboard, mouse, voice recognition system, CRT, printer, disc drives, etc. Additional components, such as cache memory, communication systems, system software, etc., may also be incorporated into each system 4, 6.

As recognized in the field, each system 4, 6 may independently include one or more central computers, i.e., servers. Here, system satellite servers may each contain only one system/module with the remainder of the systems/modules resident on a centrally located server. In another embodiment, a number of servers may be present in a central location, each having different software applications resident therein. Alternatively, a number of servers may reside in a central location, each containing all of the systems/modules resident therein.

A server computer typically comprises an advanced mid-range multiprocessor-based server, such as the Ultra II from Sun Microsystems or the RS6000 from IBM, utilizing standard operating systems, software written in C++, Java or a similar language, which is designed to drive the operation of the particular hardware and which is compatible with other system components, and I/O controllers.

It should be emphasized that while finance system 4 and administration system 6 may independently include distributed systems/modules/memory, as described above, systems 4, 6 do not share structure except for a transmission system 24 for communication there between, that is, administration system 6 is non-resident or remote relative to finance system 4.

Each system 4, 6 includes a program product that, when executed by their respective CPUs, comprises various functional capabilities owned by each system. For instance, in terms of finance system 4, memory 14 preferably includes a program product 24. In the following discussion, it will be understood that the method steps discussed preferably are performed by a processor executing program product/instructions stored in memory of each system 4, 6. Program product can be initially loaded into memory of each system 4, 6 from, for example as shown for finance system 4, a computer readable medium 26. It is understood that the various devices, modules, mechanisms and systems described herein may be realized in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

Peripheral components of stock option and purchase plan system 2 may include a transmission system 24 for data transfers between finance system 4 and administration system 6, a public exchange 28, as will be described in more detail below, and a quote server 30. Quote server 30 provides real-time stock market quotes to finance system 4. In particular, quote server 30 preferably provides stock quotes for the participant's employer and also quotes for the major indices such as the Dow Jones Industrial Average, the S&P 500 and the NASDAQ Composite index. The REUTERS QUOTRON server is a particularly useful quote server in the practice of the present invention.

Once access to finance system 4 is complete, participant 10 selects a transaction of interest. For purposes of this disclosure, the term "transaction" may be used to refer to all of a participant's activity relative to finance system 4, e.g., inquiring of option and/or stock status, issuing full or partial sale orders and receiving proceeds. As will be described below, each request is processed by system logic in accordance with a set of rules pertaining to the inquiry of option and/or stock status and the execution of trades made pursuant to stock option and purchase plans. Participant trade orders generated by finance system 4 are forwarded to trading system 12 for transmission to exchange 28. Confirmation of executed orders may be forwarded to participant 10 via U.S. mail when the trade settles (i.e., 3-5 business days after execution). Related participant information is resident in volatile data storage 32 of memory 14 of finance system 4 pursuant to at least one daily data transfer from nonvolatile database 22 of administration system 6 via transmission system 24. Preferably, participant information is stored on computer readable disks with the random access memory of finance system 4 loaded with participant information as transactions occur. Accordingly, volatile data storage 32 does not require, but may include, permanent data storage. The activity for all participants in a given time period is stored in finance system 4 and transmitted back to nonvolatile database 22 of administration system 6, via at least one daily data transfer. A data control system 34 of administration system 6 thereafter updates participant information in accordance with the data transmission. Thus, volatile data storage 32 does not permanently reside within finance system 4. Conversely, nonvolatile database 22 provides a less transient storage for participant particulars.

A participant 10 provides the cash or stock available to fund transactions through limited brokerage accounts. As used herein, a "limited brokerage account" only maintains participant information regarding employer-sponsored stock option and purchase plans. Such information, for example, is described with reference to the participant information stored in volatile data storage 32. Preferably, the accounts used for stock purchase transactions are of a different type (e.g., status or classification) than those used for option transactions. A limited brokerage account should be contrasted with a full-service brokerage account, which requires more comprehensive participant particulars, such as provided by section 405 of the New York Stock Exchange constitution and rules. Thus, cash and/or stock is resident in a participant's limited brokerage account in order to fund transactions. Alternatively, a participant 10 may forward cash via check, money order or bank wire or forward stock to the limited brokerage account in order to fund the transaction. A participant may also forward a check, money order or bank wire to fund the taxes, commissions, and fees associated with a given transaction.

Transactions may also proceed on a cashless, stock swap or sell to cover basis. As used herein, a cashless sale refers to the disposal of stock shares without an initial contribution by participant 10. For option exercise, where the option price is below the market price (which usually is the case), the shares are exercised at market price with the option grantor (i.e., company) receiving the option price for the shares and participant 10 receiving the remaining proceeds (i.e., market price minus option price). A stock swap involves the use of stock directly contributed by participant 10. Assuming participant 10 has sufficient stock to cover the taxes, fees and commissions associated with the trade, these will be deducted from the new stock purchased without participant exercise of the stock already owned to cover these costs. In a sell to cover transaction, the participant need only dispose of sufficient stock to pay for the taxes, fees and commissions associated with a given transaction. Participants 10 with stock shares acquired as the result of a stock purchase plan can likewise dispose of shares with the fees associated with the transaction deducted from the net proceeds, utilize a stock swap, or provide the cash to cover transaction fees. Accordingly, each participant need not have an established brokerage account in order to utilize the system of the present invention. This allows the system to accommodate a greater number of employees and employers than heretofore known in the art.

Communication system 8 provides a means by which a participant 10 interacts with finance system 4. Communication system 8 may be provided in the form of a telephonic communication, the Internet, or through an Intranet interface operated by NASD Series 7 (National Association of Securities Dealers)-licensed individuals. Such persons are licensed to provide limited brokerage services (i.e., exercise of options and/or the sale of shares) pursuant to company-sponsored stock option and purchase plans. In this instance, participant 10 would interact with the NASD-licensed individual by, for example, telephone or personal contact. The NASD-licensed individual would, in turn, interact directly with finance system 4 through, e.g., an Intranet interface. The type of communication system 8 will determine the connectivity of communication system 8 to finance system 4. For example, Internet and Intranet connectivity utilize standard TCP/IP sockets-based protocol to connect to system 4. Likewise, telephonic connectivity utilizes conventional T1 connections.

Preferably, communication system 8 is equipped with disaster recovery capabilities. That is, a backup system for providing communication access to finance system 4 in the event that the primary communications means in use is not functioning. For example, in the event that both of the primary and backup telephonic systems are malfunctioning, communication system 8 can route incoming telephone calls to a customer service representative. Similarly, a conventional distributed director would be utilized to detect failure at an Internet site and route Internet requests to an alternative site. Advantageously, the disaster recovery capabilities ensure access to the system 24 hours per day/7 days per week subject to scheduled maintenance and normal outages. Typically, scheduled maintenance occurs between 3:00 am and 3:30 am on days when the public exchange is open for trading.

While particular exemplary types of communication systems 8 have been denoted, it should be recognized that other known or later developed systems may suffice.

Trading system 12 accepts participant orders from finance system 4 and immediately forwards these to an exchange 28 for execution. When exchange 28 is closed, typically between 4:00 pm and 9:30 am on weekends and on holidays for a public exchange, trading system 12 stores participant orders until about 7:00 am on the next trading day, at which time the trades are forwarded to exchange 28 for execution.

Referring again to FIG. 1, a third party administration system 6 is shown. Administration system 6 provides a means by which a client company of system 2 may be integrated into system 2, and participant information entered, updated and tracked. Administration system 6 therefore provides for delegation of functions not suited for the primary functioning of finance system 4. Finance system 4 is more efficient as a result because it does not have to interact with client companies. In addition, it does interact with participants 10 relative to the more rudimentary tasks of participant information input, updating, etc.

Administration system 6 includes a data control system 34 that manipulates, manages and updates participant 10 and other information stored in nonvolatile database 22. Administration system 6 may also include other system(s) 36 known in the art for accessing the system, interfacing with system 6, and the like.

In accordance with the invention, "participant information" may pertain to client employer, related participant-specific information such as name, address, social security number, personal identification number (PIN), participant position (i.e., the number of shares owned), option exercise and/or purchase and sale history for stock shares, vest dates and expirations, information pertaining to the type of compensation offered by a particular employer (i.e., stock option plan and/or stock purchase plan), amount of payroll deduction (for stock purchase plans) and whether participant 10 is considered an insider or outsider pursuant to the New York Stock Exchange constitution and rules. Advantageously, this information can be customized for each client employer. For example, a client employer may offer only a stock option or a purchase plan or both. In another instance, the client may charge certain fees for the exercise of options and/or purchases while another employer may not. This flexibility also allows system 2 of the present invention to accommodate international participants and employees.

Useful standardized data control system 34 software may be obtained from CMS or Equity Edge/E* Trade Business Solutions. As indicated above, participant information resident in nonvolatile database 22 is transferred to volatile data storage 32 of finance system 4 pursuant to a data transfer that preferably occurs daily. Generally, this transfer of participant 10 information occurs during hours when the exchanges 28 are closed; typically between 4:00 pm and 9:30 am during the week, and during weekends and holidays. System 2 automatically batches trade information at the end of the trading day (e.g., 4:30 pm) from trading system 12 to finance system 4. This trade information is then manually transferred to administration system 6 for processing (e.g., between 5:00 pm and 9:00-10:00 pm). After appropriate processing, the updated participant information is thereafter periodically transferred back to finance system 4 either manually or automatically prior to the opening of the next trading day, typically between the hours of 9:00-10:00 pm and 7:00 am. In some instances, data may be transferred to finance system 4 more than one time. By way of illustration, after a trade has been executed, the trade information is transmitted to administration system 6 pursuant to the daily data transfer, and the appropriate withholding taxes, commissions and fees are ascribed to the trade by the applicable company contract information. The resulting data is then transmitted back to finance system 4 for further processing (i.e., confirmation) and distribution.

Updating of participant information is provided by administration system 6. Such updating includes adding new participants 10, modifying trading and vesting dates, revising the number of options and/or shares available for exercise and/or purchase for each participant 10 in response to, for example, recently executed transactions, employer grant, expiration dates, or the like. Advantageously, updating of each participant 10 position is performed by administration system 6 in accordance with customization applicable to that participant's employer. The resulting information is then transmitted back to finance system 4.

Administration system 6 also provides a platform that enables the addition of a new employer client company to system 2. In this instance, the company furnishes client information for processing by administration system 6 including company profile, plan information, account profile, grant profile, tax information, dispositions, contact information, termination information, participant particulars, exercise information, etc. This client information is thereafter forwarded to finance system 4 where it is validated for use. Use of a separate administration system 6 in this manner permits an unlimited number of company clients to be accommodated by the present invention. In view of the foregoing, administration system 6 provides a means by which participants 10 and client companies can be added, participant information maintained and updated without interfering with, or complicating, finance system 4.

Again referring to FIG. 1, finance system 4 preferably includes at least one set of rules pertaining to inquiry of option and/or stock status and automatic processing of a transaction pursuant to at least one of the stock option plan and stock purchase plan. Finance system 4 preferably comprises at least a volatile data storage 32 for storing participant information pursuant to a data transfer from a non-resident, nonvolatile database 22; an interface system 38 for interacting with participant 10 regarding a requested transaction; and a rule system 40 for processing transactions with trading system 12 in accordance with at least one set of transaction rules. Finance system 4 may also include a journaling system 42, a confirmation system 44 and a modeling function 46, as will be described below. Other subsystems such as a monitoring system 48 of interface system 38, may also be incorporated as will also be described below.

Figure 2:
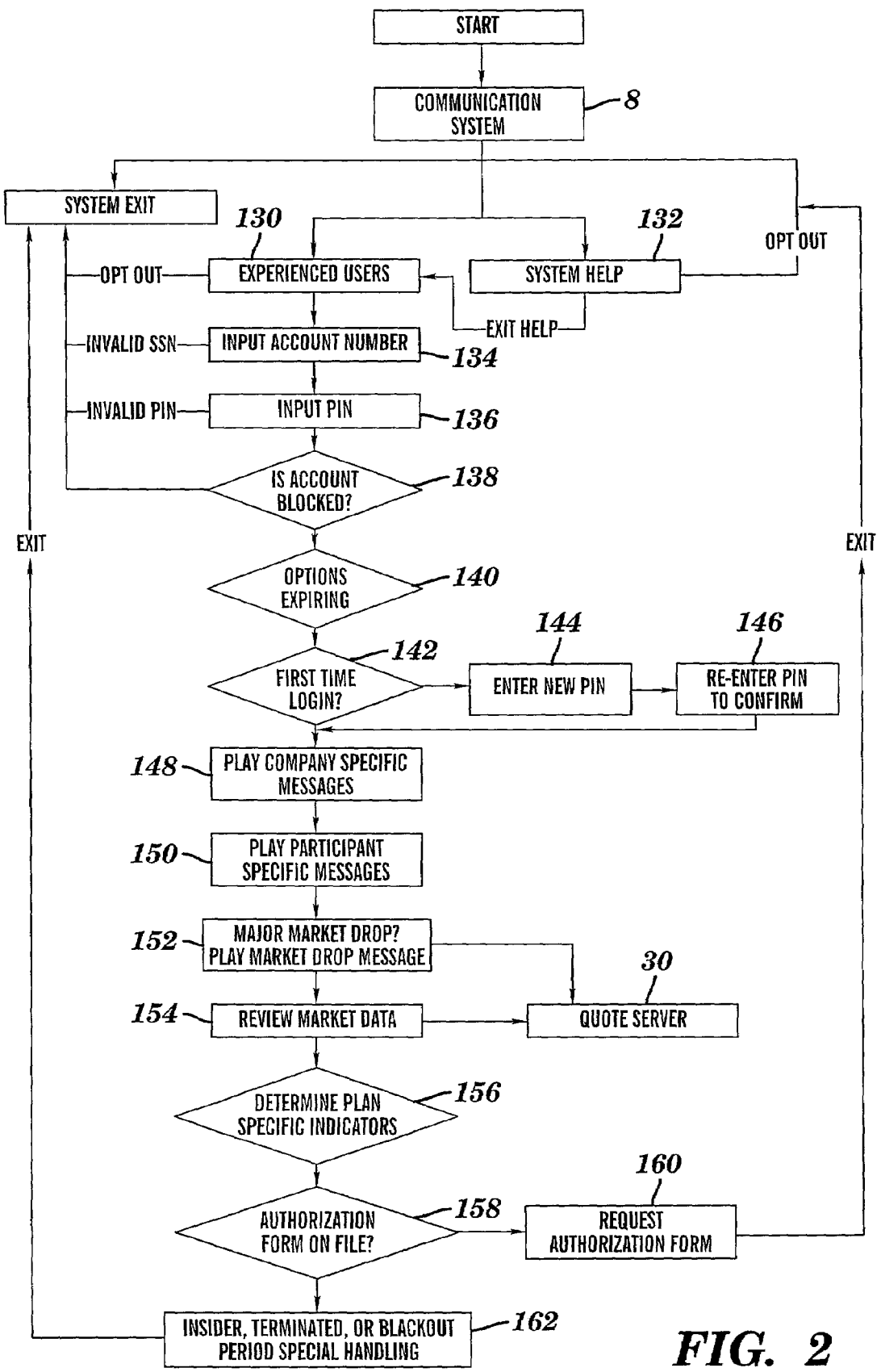
FIG. 2 is a flow diagram depicting system logic for participant access into the system.

Turning now to FIG. 2, the system logic for a first preferred embodiment of participant 10 accessing finance system 4 of the present invention is shown. Communication system 8 provides the means for a participant 10 to access finance system 4, and interface system 38 provides a means to interact with finance system 4, i.e., to provide instructions to system 4 and to view system responses. It should be recognized that interface system 38 may take a variety of forms, e.g., an interactive voice response system (i.e., a telephone-driven interface), Web-based access via, for example, the Internet and Web pages, and the like. The following description generally describes interface system 38 in terms of a first preferred embodiment of an interactive voice response, but also utilizes displays of a second preferred embodiment of a Web-based interface system 38 where helpful to understand system logic.

Interface system 38 logic starts during the login process, where participant 10 accesses communication system 8. For example, participant 10 may telephone a finance system 4 interactive voice response. As another example, if a participant 10 accesses finance system 4 using the Internet, a Universal Resource Locator (URL) may be input to a participant's Internet browser to access finance system 4. At that point, logic allows a participant 10 to proceed as an experienced user 130 or to obtain system help 132, for example, by providing participant 10 choices selectable over the telephone. As is known in the art, system help 132 contains instructions on navigation and use of the system. After navigating system help 132, a participant 10 is permitted to opt out of the system or choose to proceed as for experienced users.

As shown in FIG. 2, where a participant 10 proceeds in finance system 4 as an experienced user, logic prompts for the input of a login number 134 and personal identification number (PIN) 136. FIG. 3 shows an entry display for a Web-based interface system. These numbers are prearranged between participant 10 and his or her employer prior to use of finance system 4, e.g., by participant 10 signing up for the stock option or purchase plan and the correlative information entered into administration system 6. Receipt of an invalid login number and/or PIN prompts interface system 38 to request participant 10 to enter a new login number and/or PIN. Receipt of, for example, three (3) invalid login number/PIN entries automatically exits and locks participant 10 out of the system. In this instance, participant 10 is required to unlock their account through a NASD-licensed individual, or a system 2 representative prior to further use. Assuming participant 10 login number and PIN has been successfully validated, system logic then determines whether the participant's 10 account is blocked in any manner 138. An account may be blocked, for instance, for a low balance. If so, logic causes participant 10 to automatically exit finance system 4. At this juncture, interface system 38 also determines whether participant 10 is logging into the system for the first time 142. If so, participant 10 is prompted to enter a new PIN 144 and reconfirm entry of the new PIN 146. Finance system 4 thereafter updates volatile data storage 32 to reflect these changes.

Interface system 38 logic correlates participant 10 with his or her employer. For instance, interactive voice response may present the company name and/or motto during access. In a second preferred embodiment of a Web-based interface system, each display (e.g., login of FIG. 3) of interface system 38 may include an employer name and logo. If necessary, interface system 38 may present participant 10 with employer specific messages 148 and participant specific messages 150. Interface system 38 may also provide participant 10 with information pertaining to the employers' policies and procedures and/or specifics of the particular plan.

In a preferred embodiment, interface system 38 then queries quote server 30 to determine whether a real time major market adjustment 152 has occurred; for example, when the market has fallen 10, 20, 30% or more. In such a case, a warning is presented to participant 10 over the telephone or, as shown in FIG. 4 for a Web-based system, logic directs interface system 38 to present participant 10 with a message 163 advising that a market shift has occurred. During a major market adjustment, it is known that the market, i.e., exchanges 28, will close during that period of instability. In this way, finance system 4 protects participants 10 from conducting transactions during periods of market instability.

System logic also allows participant 10 to query quote server 30 for current market data 154, e.g., current stock price information. In accordance with the present invention, current stock price information includes stock last price, bid price, last price (Dow Jones), stock net change, net change (Dow Jones) and is provided during market hours on a real-time basis. Preferably, and depending upon the specifics of the employer's plan, system logic may trigger access of monitoring system 48, which monitors quote server 30 in the event that finance system 4 does not receive a quote from quote server 30, typically within 30 seconds to 30 minutes, and preferably within 5 minutes. This feature ensures that inaccurate quotes are not transmitted to participant 10. Preferably, monitoring system 48 notifies a system monitor and/or paging service in the event quote server 30 fails to provide a quote within the dictates of a particular company plan.

System logic thereafter determines whether participant 10 is participating in a stock option plan, a stock purchase plan, or both 156. In most instances, participant information in volatile data storage 32 will indicate the participant's 10 plan(s). In the case of a Web-based system, confirmation of this determination may be made or confirmed, for example, by examining cookies previously placed on participant 10 system and reviewed during login. Logic also determines whether the individual participant has previously executed an authorization form 158. If not, interface system 38 accords participant 10 the option to request an authorization form 160 (FIG. 2), e.g., by providing telephone touch key selections or, as shown in FIG. 5 for a Web-based system, presenting selectable hypertext links on a display. The authorization form may then be delivered via fax, mail or by e-mail where appropriate safeguards are built into finance system 4. When participant 10 has not provided an authorization form, interface system 38 automatically exits participant 10 from finance system 4. If logic produces an affirmative response to the query for an authorization form, interface system 38 also determines whether additional blocks exist 162 (FIG. 2) which would prevent use of finance system 4. Exemplary blocks may exist where participant 10 is an insider, terminated from the company, or subject to a blackout period. In such instances, logic automatically exits participant 10 from trading via finance system 4.

Figure 6:
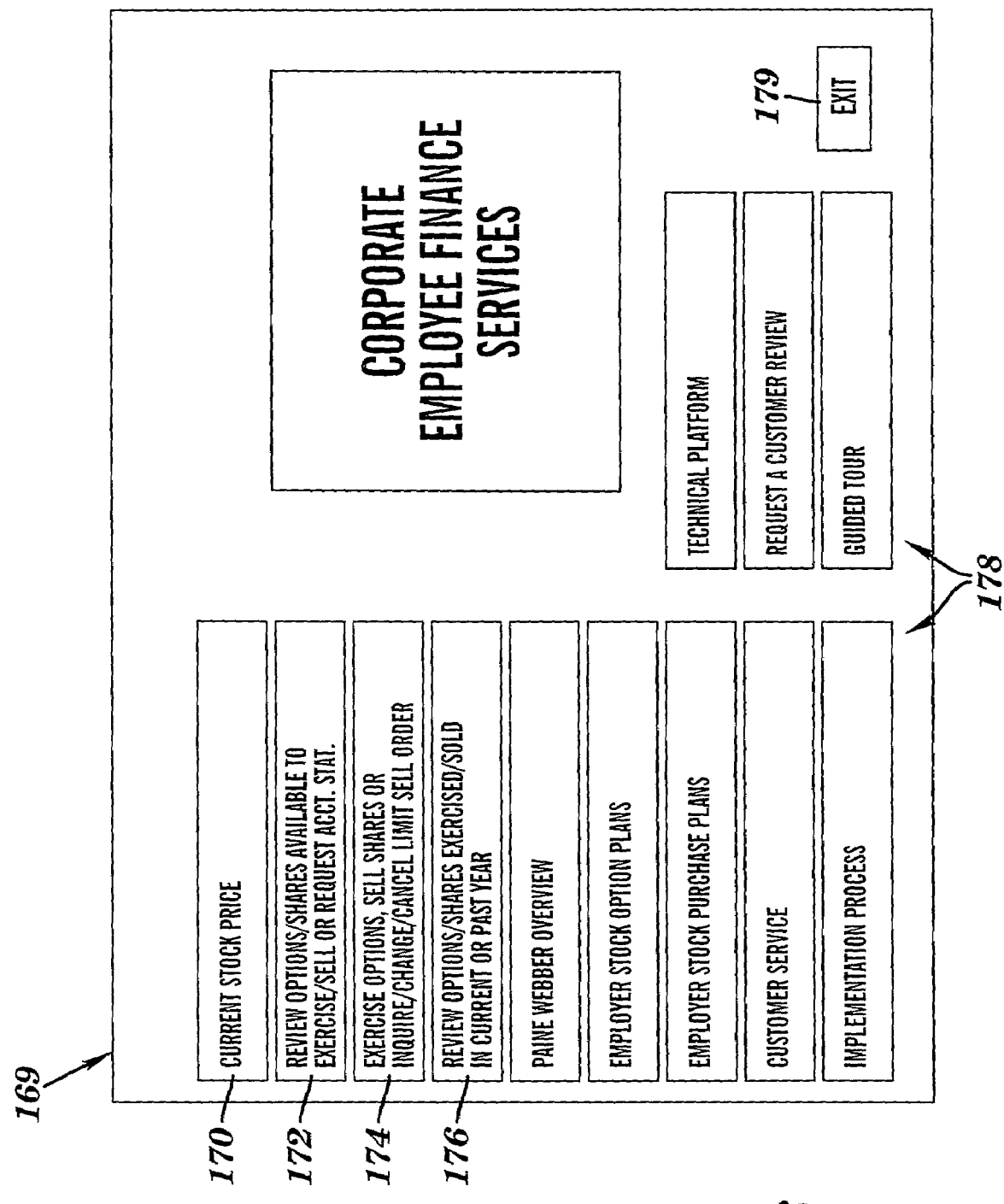
FIG. 6 is a display of a Web-based interface system illustrating process selections of the present invention.

Once successful login has been attained, participant 10 is presented with a main menu 169, shown for a Web-based system in FIG. 6, of selections which provide for further interaction with finance system 4. While main menu 169 has been shown in terms of the second preferred embodiment of a Web-based interface system 38, it should be recognized that the selections illustrated in FIG. 6 may also be provided via a telephone touch pad relative to the first preferred embodiment of an interactive voice response.

Generally stated, interface system 38 permits participants 10 to exercise stock options, sell a portion or all shares of stock already acquired, or hold a stock in a limited brokerage account. Participant 10 is presented with different selections depending on plan entitlements. That is to say, only those shares or options that have been actually acquired pursuant to an employer stock option or stock purchase plan are available for processing by finance system 4. Further, only those selections which have vested for a given participant 10, as determined by administration system 6, are forwarded to finance system 4 pursuant to the data transfer. The exemplary selections shown in FIG. 6 provide a full palette of selections, i.e., participant 10 presented with these selections participates in or has vested interests in both a stock option plan and a stock purchase plan.

The interface shown in FIG. 6 allows participant 10 to select between querying current stock price information 170 via quote server 30; review options/shares available to exercise/sell or request account statement 172; exercise options, sell shares or inquire/change/cancel limit orders 174; review options and/or shares exercised and/or sold in the current or past year 176; perform other functions (discussed later) 178; or exit 179 system 4. With regard to selections with multiple sub-selections, e.g., selection 172, interface system 38 presents sub-menus for selection as readily known in the art.

As previously discussed, selecting to query current stock price information selection 170 will provide last price, bid price, last price (Dow Jones), net change, net change (Dow Jones) from quote server 30 on a real-time basis. As also discussed, interface system 38 is preferably equipped with a monitoring system 48 which serves to notify a system monitor and/or paging service in the event quote server 30 fails to provide a quote.

Figure 7A:
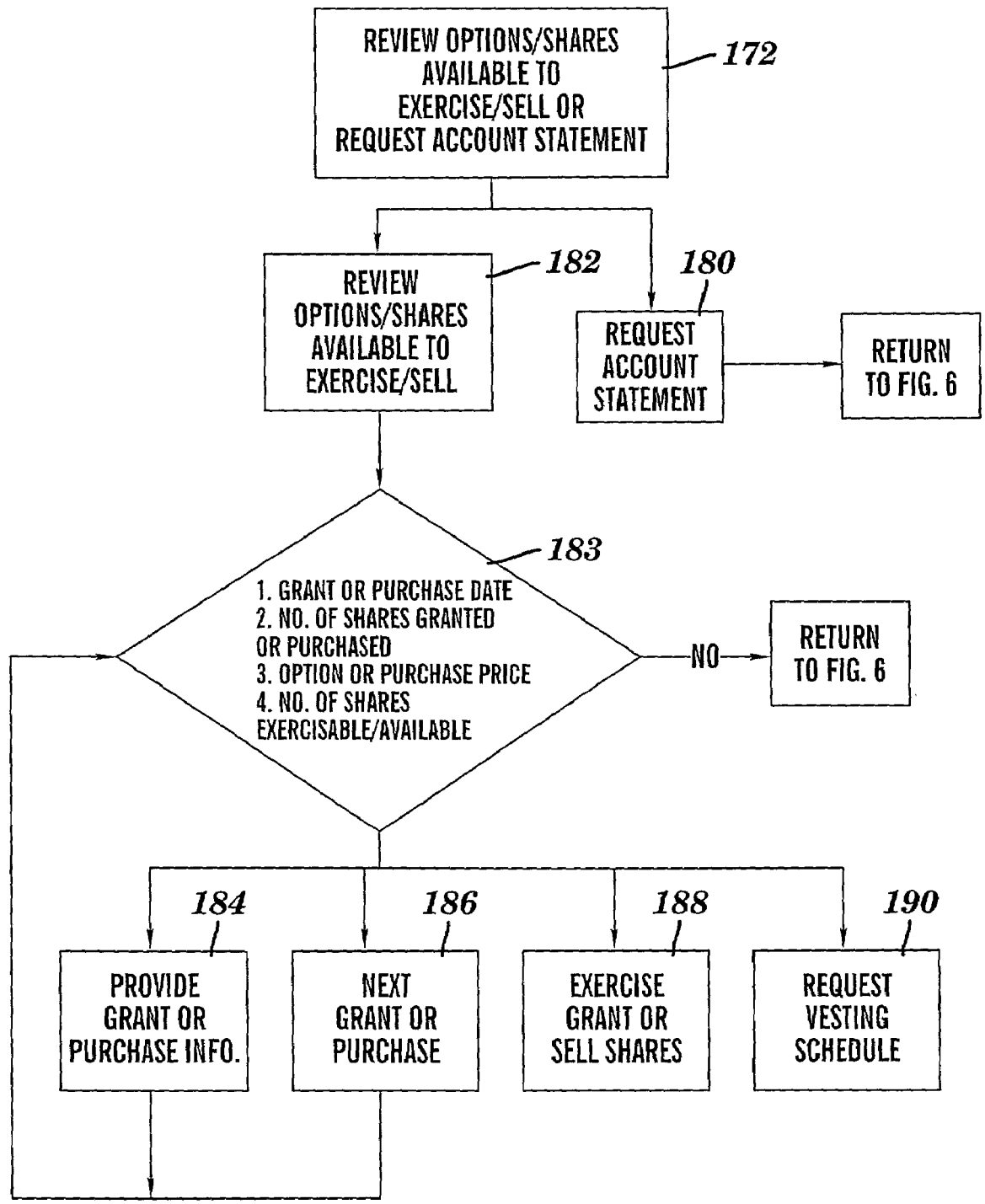
FIG. 7A is a flow diagram depicting system logic to review available options and/or shares.

FIG. 7A illustrates interface system 38 logic where participant 10 chooses review options/shares available to exercise/sell or request account statement selection 172. Discussing first a participant 10 request for an account statement 180, logic branches to a delivery option (not shown) (i.e., fax, mail, email) and then returns participant 10 to main menu 169, shown in FIG. 6.

As shown in FIGS. 7A, with respect to selection of reviewing options and/or shares available to exercise and/or sell 182, logic 183 determines (1) grant or purchase date; (2) number of shares granted or purchased; (3) option or purchase price; (4) number of shares available for exercise and/or sale. Where a negative response is provided by finance system 4, i.e., no options or shares are available, interface system 38 returns participant 10 to main menu 169, shown in FIG. 6. A positive responses causes logic to branch to provide specific grant or purchase information 184 for a first group of options and/or shares; provide grant or purchase information for other available options and/or shares 186 (not shown in FIG. 7B); provide the ability to exercise grants or sell shares 188; or request a vesting schedule 190 for delivery via fax, mail or e-mail. Of course, these same selections are available for other groupings of options and/or shares held by participant 10.

Figure 7B:
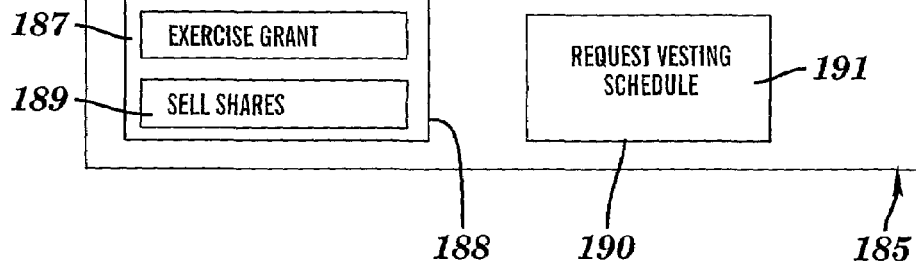
FIG. 7B is a display of a Web-based interface system illustrating possible options in accordance with the logic of FIG. 7A.

Referring to FIG. 7B for a Web-based system display 185, a participant statement illustrates information 184 regarding grants for a first group of options. A participant 10 may select from exercise grant selection 187 or sell shares selection 189 depending on available securities. Additionally, participant 10 may select a request vesting schedule selection 191. The selections shown in FIG. 7B are audibly provided where an interactive voice response type interface system 38 is used.

Figure 8:
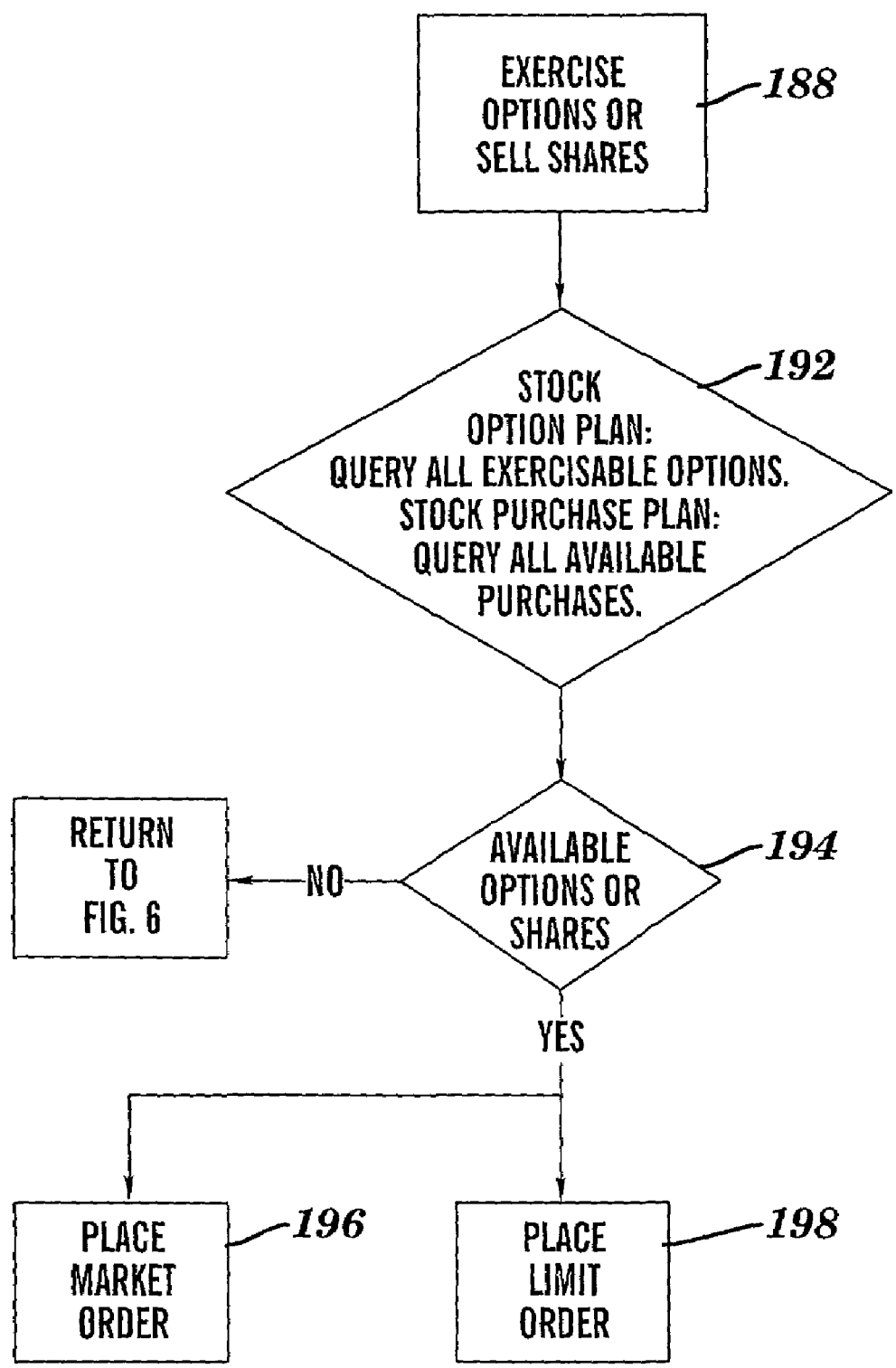
FIG. 8 is a flow diagram depicting system logic that enables a participant to place orders for execution on the exchange.

FIG. 8 illustrates interface system 38 logic for the exercise of option grants, or the sale of shares 188 (shown in FIGS. 7A and 7B). Where participant 10 chooses to sell shares, system logic queries all saleable shares 192. This query also takes into account any shares pending execution. Similarly, for the exercise of options, system logic queries all exercisable options, taking into account underwater grants and any options pending execution 192. Where an affirmative response in evaluating the existence of exercisable options and/or sellable shares 194 is produced, participant 10 is prompted to place a market order 196 or limit order 198. A "market order" is an order to buy or sell a security at the best available price and a "limit order" is an order to buy or sell a security at a specific price or better. If it is determined 194 no options and/or saleable shares are available, participant 10 is returned to main menu 169, shown in FIG. 6.

As noted above, transactions can be executed via cash or other noncash means, such as by cashless, stock swap, or by selling sufficient shares to cover associated transaction costs, wherein participant 10 utilizes an NASD-licensed individual to execute trades via an Intranet. Where communication system 8 is a telephonic system or the Internet, transactions are executed on a non-cash basis.

Figure 9:
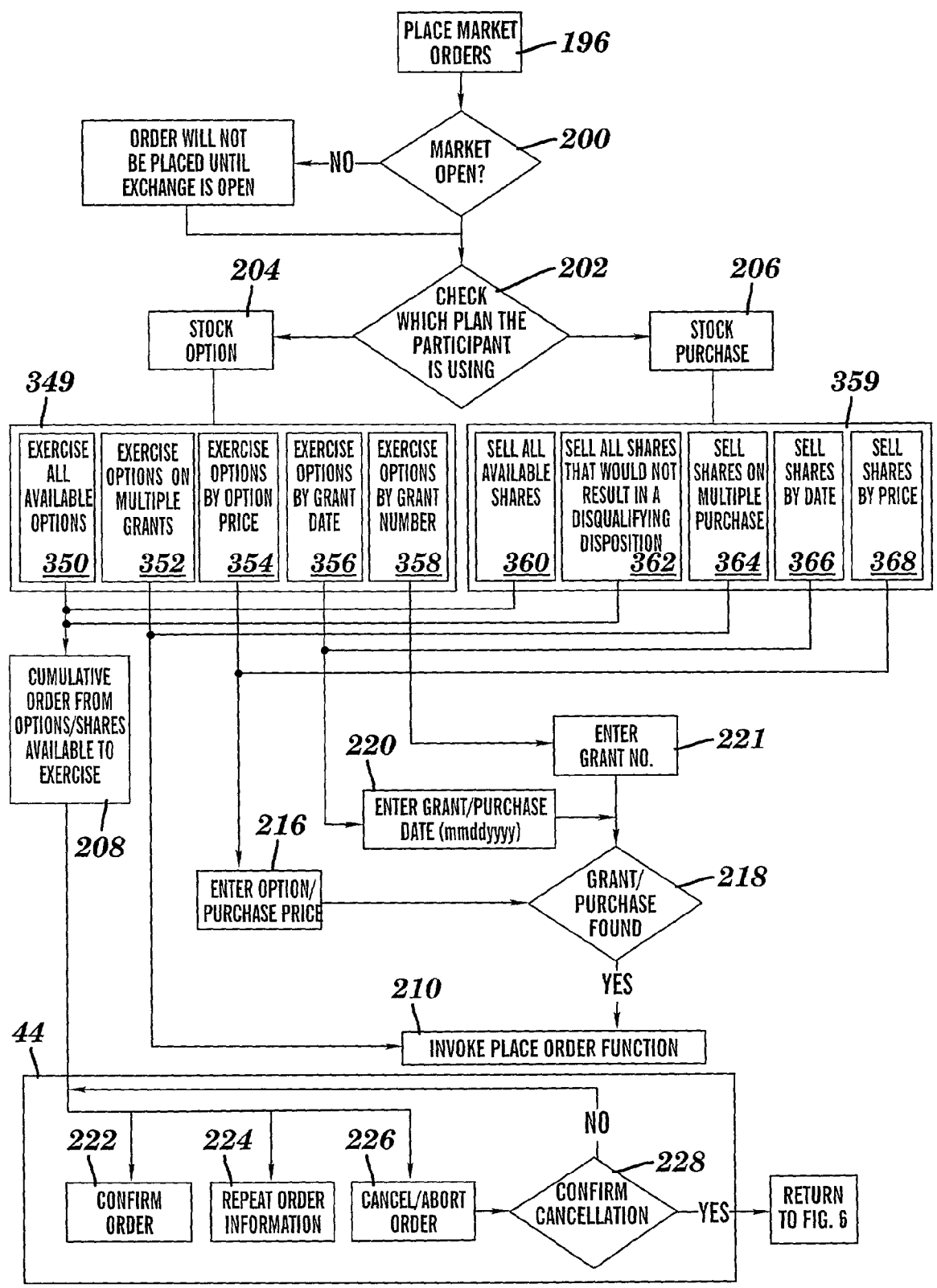
FIG. 9 is a flow diagram depicting system logic for the placement of market orders.

A market order 196 placed in accordance with the present invention proceeds as illustrated in FIG. 9. Although not shown, interface system 38 may initially determine if any underwater options or shares exist and if so, provide a warning to participant 10 to stop the transaction. "Underwater options or shares" are those securities that are out-of-the-money, e.g., a call option with an exercise price higher than the current price of the underlying contract.

Assuming a cashless transaction, logic checks an internal clock 200 to determine whether an exchange 28 is open. Of course, this is determined by different criteria such as weekend, holiday, and time of day. Where exchange 28 is closed, the order proceeds as described below and is held in trading system 12 until exchange 28 opens. When exchange 28 is open, logic determines which type of transaction (i.e., option exercise and/or stock sale) is sought 202, i.e., which plan participant 10 is using, and branches to the appropriate block 204, 206, with a subsequent market order forwarded to the exchange on an essentially "real-time" basis, as that term is known in the art.

Option exercise block 204 allows participant 10 to select from options exercise menu 349, exercise all available options 350, exercise options on multiple grants 352, exercise options by option price 354, exercise options by grant date 356 or exercise options by grant number 358. Likewise, stock sale block 206 allows participant 10 to select from a stock sale menu 359 to sell all available shares 360, sell all shares that would not result in a disqualifying disposition 362, sell shares on multiple purchases 364, sell shares by purchase date 366 or by purchase price 368.

The rules permit participant 10 to perform other functions related to option and/or share exercise and/or sales at block 204, 206. These include the ability to change the participant's PIN, change the source or recipient of settlement proceeds (i.e., change bank wire routing, change from employee payroll deduction to automatic debit from a particular participant account or the like), and revise federal tax withholdings of settlement proceeds. As previously discussed, finance system 4 also allows participants 10 to perform calculations to ascertain the effect of various scenarios on option/share value.

Where participant 10 chooses to exercise all available options 350 or sell all available shares 360 (including all shares that would not disqualify the participant 362) system logic builds a cumulative order 208 for transmission to trading system 12 and exchange 28. After cumulative order 208 is transmitted to trading system 12, interface system 38 logic allows participant 10 to access confirmation system 44 to confirm the order 222, repeat order information 224 or cancel/abort the order 226. If participant 10 cancels an order, interface system 38 then queries participant 10 to confirm cancellation 228. Where a negative response is received, interface system 38 recycles participant 10 back to confirm the order 222, repeat order information 224, or cancel/abort the order 226. Once a positive response is received, interface system 38 cancels the order and forwards participant 10 back to main menu 169, shown in FIG. 6.

Where participant 10 does not exercise all available options 350 or sell all available shares 360, individual orders are prepared, as will be described below, and transmitted to trading system 12 and exchange 28.

As further shown in FIG. 9, where participant 10 chooses to exercise options or sell shares by price, he or she enters the option or purchase price 216. For example, at an audible query for a price, interface system 38 determines 218 that the appropriate option grant and/or shares acquired from a previous purchase exists, and the grant/purchase information is forwarded to the place order function 210. Similar processing logic is utilized where participant 10 chooses to exercise options or sell shares by grant or purchase date, or grant number. In such instances, the system requires participant 10 to enter the grant or purchase date 220 or grant number 221, (e.g., at a voice query) and the system then determines whether the grant or shares acquired from a previous grant/purchase exists 218 and forwards the grant/purchase information to the place order function 210.

Where participant 10 chooses to exercise options or sell shares on multiple grants and/or purchases 352, 364, system logic forwards this request to the place order function 210, discussed below. As will be described, this feature allows the system to accept orders from a single participant 10 across multiple option grants or share purchase, with these orders immediately sent to trading system 12 for forwarding to exchange 28.

Figure 10:
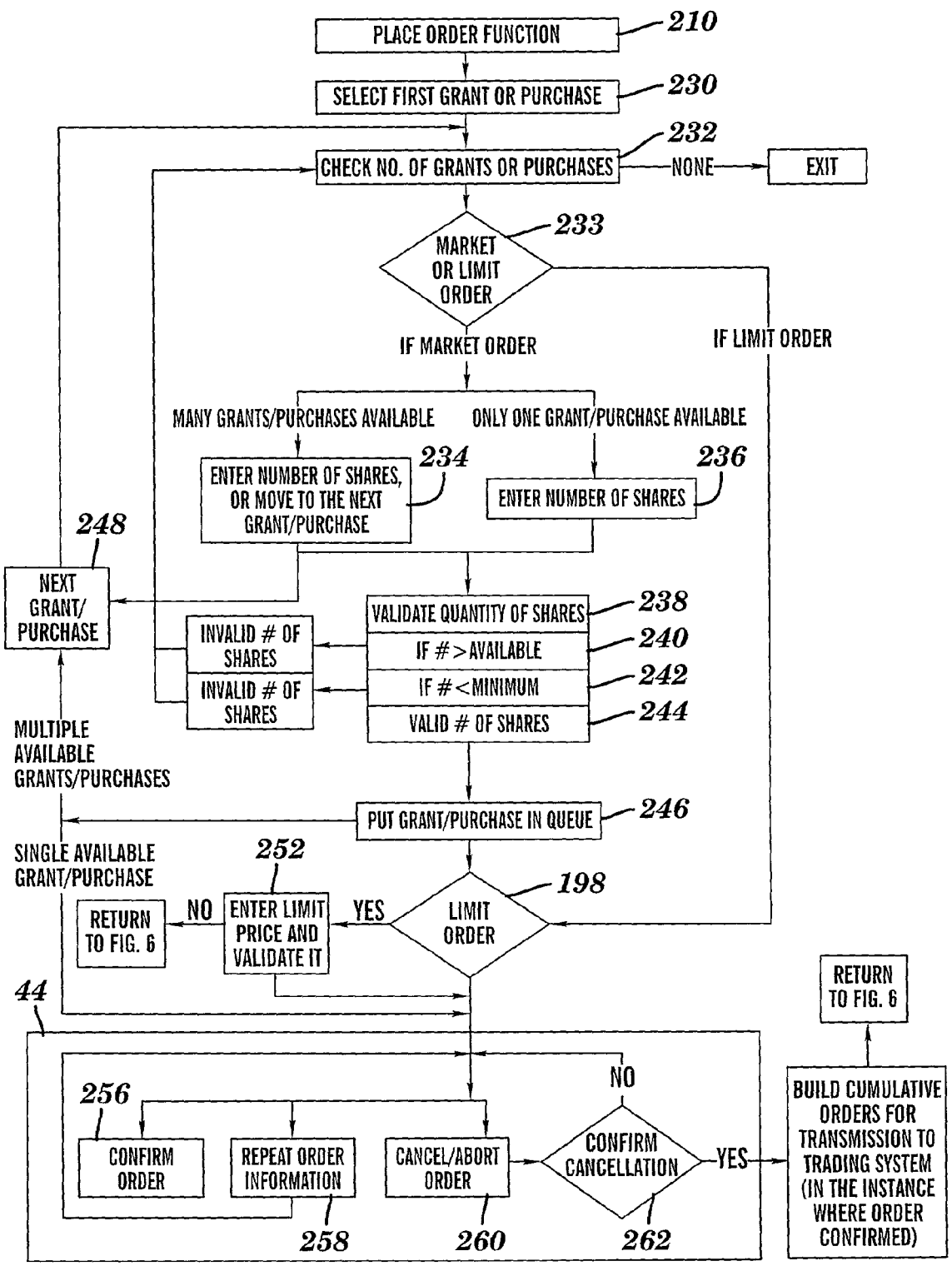
FIG. 10 is a flow diagram depicting a place order functionality available for the execution of multiple options and/or shares.

Turning now to FIG. 10, place order function 210 is described in detail. At block 230, logic requires that for each respective group of options and/or purchases, participant 10 choose the first grant or purchase to exercise/sell based on grant/purchase date, total number of options/shares, option and/or purchase price and the number of options/shares available to exercise and/or purchase. Next, the number of grants or purchases available to exercise and/or sell is again compared 232 to participant information stored in volatile data storage 32 of finance system 4. Where logic determines that available grants/purchases do not exist, system logic automatically exits participant 10 from finance system 4. Alternatively, the transaction is allowed to proceed as described below. In this case, finance system 4 again confirms that the transaction is a market order 233, as selected by participant 10 (FIG. 8). Where a limit order is detected, logic proceeds to block 198 (discussed below). If a market order is detected, system logic requires participant 10 to choose a number of options and/or shares to execute and/or sell 234, 236 or to choose another group of grants and/or sellable shares 248 (in the event that more than one grant/purchase is available). This may be accomplished by selecting appropriate number of options and/or shares, etc. with an audible query of interface system 38. The number of options and/or shares selected is validated against the number available for exercise or sale 238, 240, 242 and where an invalid response is detected, participant 10 is forwarded back to box 232 to review the number of grants or shares acquired from a previous purchase. Where a valid number of shares is detected and the exercise or sale price has been confirmed 244 (where only one grant/purchase is available), the grant/purchase is placed in queue 246 where an order is built and forwarded to trading system 12 and exchange 28. Where multiple grants/purchases are available, logic moves to block 248 to repeat the exercise process for the next group of grants/purchases. That is, logic cycles through again to query participant 10 for further grants/purchases.

Where the transaction is found to be a limit order 233, 198, participant 10 enters and validates the limit price 252. Finance system 4 confirms this against the limit price previously set (discussed below). If a correlation is found, the transaction proceeds as illustrated. If not, participant 10 is returned to the main menu 169 shown in FIG. 6.

Interface system 38 activates confirmation system 44 to confirm or cancel the transaction as illustrated in blocks 256-262. Where the order is confirmed, interface system 38 builds a cumulative participant order for transmission to trading system 12 and exchange 28. Advantageously, finance system 4 allows participants 10 to exercise stock options and purchase stock shares in a single transaction. That is to say, finance system 4 detects that both option grants and sellable shares are available and forwards the participant back to main menu 169 illustrated in FIG. 6 to allow for exercise of another type of compensation. Where finance system 4 receives a negative response, i.e., no additional exercisable options or sellable shares, the order is forwarded to trading system 12 and exchange 28. Market orders are changeable only when exchange(s) 28 are closed, typically on weekends, holidays, and between 4:00 p.m. and 9:30 a.m. the following day.

Figure 11:
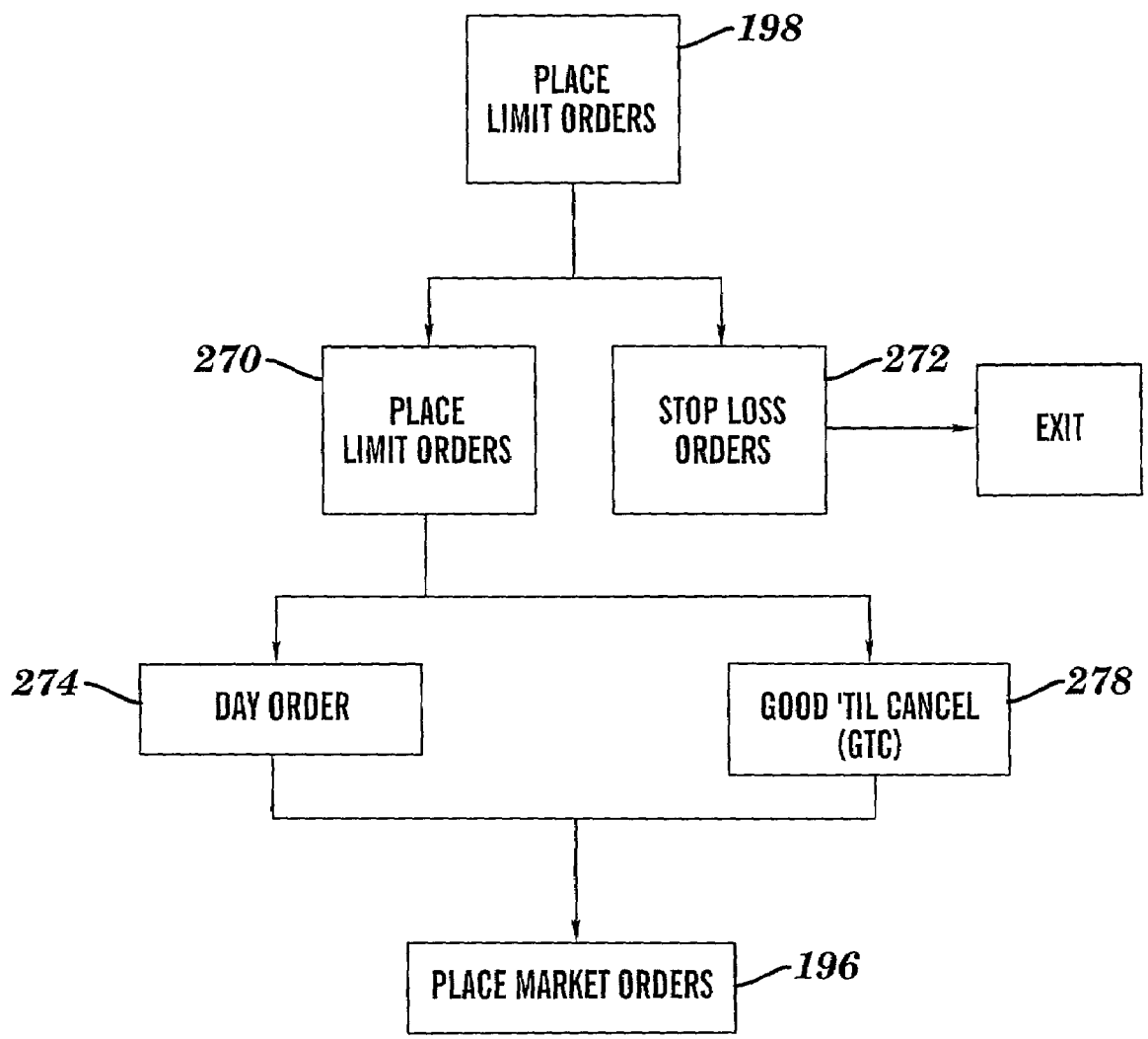
FIG. 11 is a flow diagram depicting system logic for placing a limit order.

Continuing with FIG. 11, there is shown system logic for placing a limit order 198. At block 198, interface system 38 allows participant 10 to enter a limit price for exercise or sale, i.e., a predetermined value at which exercise or sale will not occur unless all criteria are met. For example, where the market price for the option/share (MP) is less than the target limit price, the system will forestall any exercise or sale orders (i.e., MP<TP, then no exercise/sale). Conversely, where the market price for the option/share is greater than or equal to the target limit price (i.e., MP>TP), then finance system 4 will allow the exercise and/or sale to proceed. In this way, finance system 4 protects participants 10 against the execution of financially deleterious limit orders.

Upon selection or determination (i.e., from FIG. 10) that participant 10 chose to place a limit order, as shown in FIG. 11, interface system 30 queries participant 10 as to whether to place a limit order 270 or a stop loss order 272. A "stop loss order" is one in which participant 10 sets a sell price below the current market price to prevent loss if the stock drops. This latter choice automatically exits participant 10 from finance system 4. In this instance, participant 10 is preferably transferred to a financial advisor for further guidance. Limit orders that may be placed include good-til-canceled (GTC) orders 276 and day orders 274. A "day order" is one that expires unless canceled or executed the day it is placed. Once the type of limit order is selected, system logic forwards participant 10 to market order block 196 for placement of orders in accordance with the pre-selected limits.

As indicated from the foregoing discussion, finance system 4 processes orders on a participant 10 request basis, except where a preselected limit price has been attained. In this instance, orders are held by trading system 12 until certain participant 10 delineated pricing criteria has/have been attained. When this occurs, trading system 12 automatically forwards orders to exchange 28 for execution.

Figure 12:
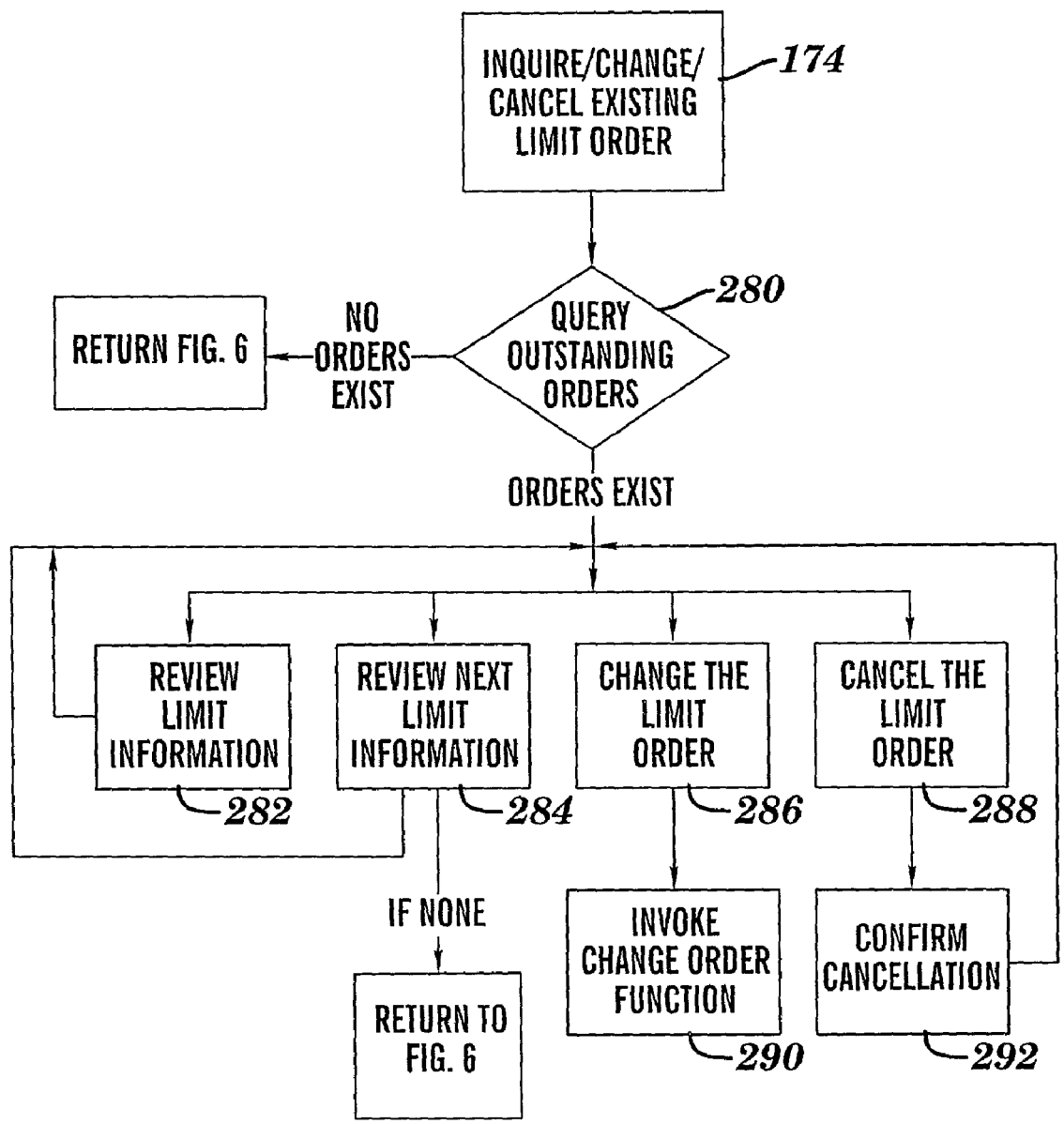
FIG. 12 is a flow diagram depicting system logic for changing a limit order.

Turning to FIG. 12, participant 10 can choose from a submenu of main menu 169 (FIG. 6) to inquire/change/cancel limit orders 174. In this case, finance system 4 logic determines whether outstanding limit orders exist 280 and if so, for each individual order, participant 10 can review limit information for a particular order 282, review limit information for other orders 284 (if available), change the limit order 286 via the change order function 290 (discussed below), or cancel the limit order 288, 292.

Figure 13:
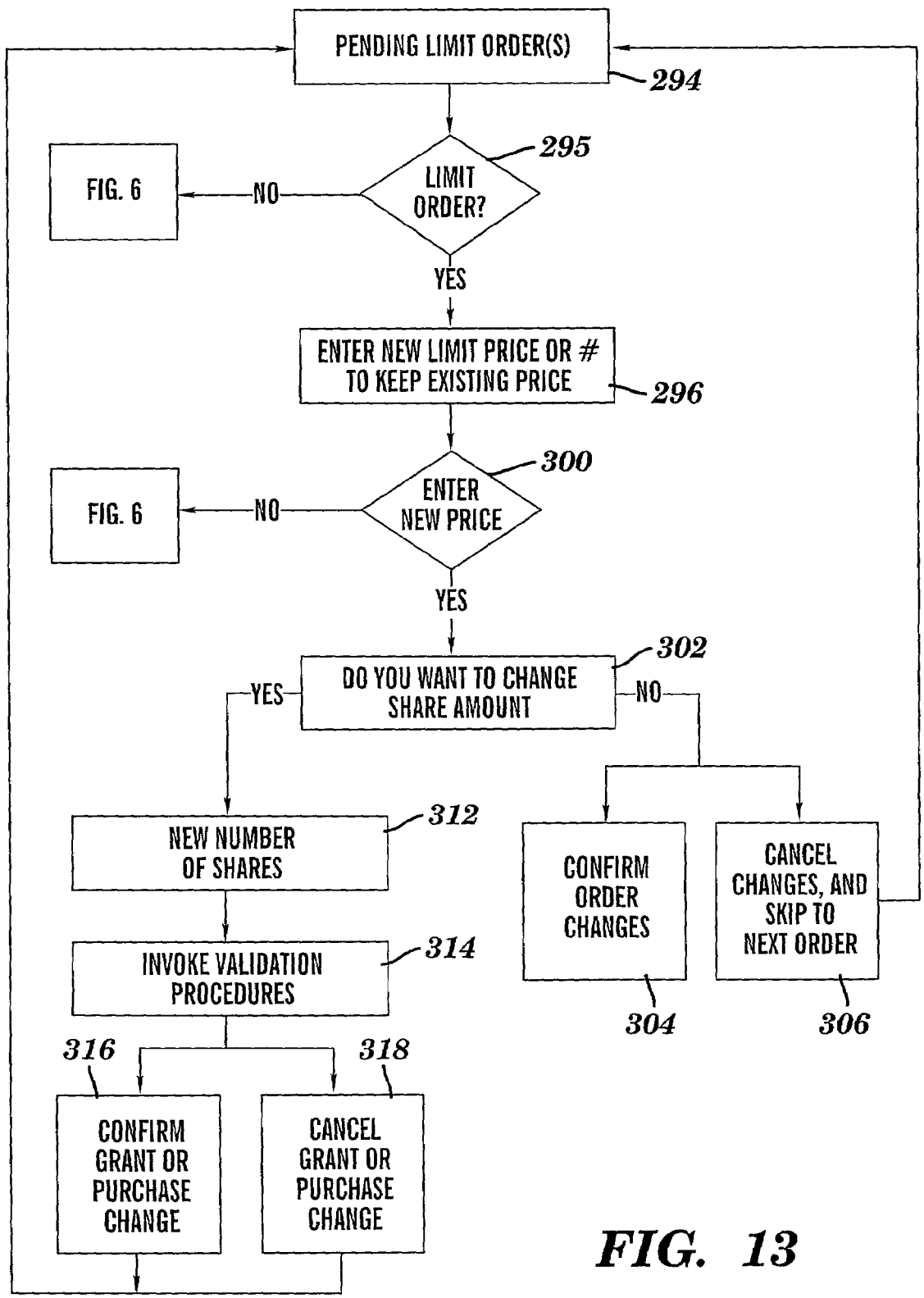
FIG. 13 is a flow diagram depicting system logic for modifying a limit price(s)

Referring now to FIG. 13 the logic for a change limit order function (selected from block 286, 290 of FIG. 12) is shown. For each limit order 294, system logic confirms that a limit order 296 exists. Assuming a positive response, participant 10 is prompted to enter a new limit price 298, 300, queried whether to change the option/share amount 302, confirm or cancel order changes 304, 306, enter a number of shares 312 and invoke validation procedures 314, 316, 318, as discussed above. All canceled or modified orders are forwarded to trading system 12 for transmission to exchange 28, or, where exchange 28 is closed, held until reopening.

Finance system 4 maintains sufficient records of prior transactions, thereby enabling participant 10 to review options and/or shares that have been exercised and/or sold in the current or past year by choosing selection 176 from main menu 169 (FIG. 6). In this instance, the records pertaining to this functionality are stored in nonvolatile database 22 of administration system 6 and transmitted to volatile data storage 32 of finance system 4 pursuant to data transmission(s). Participant 10 can view this information via any available means, as for example, by interactive voice response system, the Internet or obtain a written record from the appropriate NASD-licensed individual.

Returning to FIG. 6, interface system 38 also permits participant 10 to perform other functions 178. Those illustrated include accessing information about finance system 4 owner, e.g., a financial services provider; accessing information about employer stock options and stock purchase plans; accessing customer service; reviewing information about implementation of plans; acquiring information about the technical platform; requesting a customer review; and/or taking a guided tour of finance system 4. In addition, other selections (not shown) may be provided relating to option and/or share exercise and/or sales. These may include the ability to change the participant's PIN, change the source or recipient of settlement proceeds (i.e., change bank wire routing, change from employee payroll deduction to automatic debit from a particular participant account or the like), and revise federal tax withholdings of settlement proceeds.

After an order has been executed on exchange 28, the executed order is stored in volatile data storage 32 of finance system 4 for transmission to nonvolatile database 22 of administration system 6. Administration system 6 ascribes brokerage fees, commissions and taxes to be applied to that particular order, and this information is transmitted back to finance system 4 pursuant to the data transfer. The executed order is then forwarded for settlement and journaling in accordance with system dictates.

Finance system 4 also preferably includes a rule system 40 (FIG. 1) that implements at least one set of rules pertaining to inquiry of option and/or stock status and execution of trades made pursuant to stock option and purchase plans. Broadly stated, these rules provide the logic instructions which direct finance system 4 to allow a participant 10 to review current stock prices; review options and/or shares available to exercise and/or sell; request account statements; exercise options and/or sell single or multiple shares; change or cancel limit orders; review options and/or shares that have been exercised and/or sold in the current or past year; and perform other general system functions (i.e., change federal withholding taxes, change bank wire routing, and the like). Thus, finance system 4 serves as the central processing unit for processing rights attendant to stock option and purchase plans.

The rules pertaining to inquiry of option and/or stock status and the execution of trades made pursuant to stock option and purchase plans process the information present in finance system 4 at the time the processing request is made. Thus, finance system 4 does not require real time access to nonresident, nonvolatile database 22 of administration system 6 in order to effectuate option exercise and/or share sale transactions. In this way, finance system 4 of the present invention significantly differs from the prior art and in particular, U.S. Pat. No. 5,671,363.

As discussed above, confirmation system 44 provides a confirmation of any trades made pursuant to employee stock option and purchase plans after the trade is executed. When a participant 10 submits a trade for execution, a confirmation number is provided. Once the trade is executed, finance system 4 forwards a confirmation of the executed trade to administration system 6, i.e., client. In addition, after the trade settles, usually 3-5 business days later, participant 10 receives a confirmation statement and the transaction proceeds, if any, via U.S. Mail. Preferably, where the transaction proceeds are distributed by check, the confirmation statement and check are transmitted to participant 10 on a single page. In addition, where participant 10 has interacted with finance system 4 at other times during a particular quarter of the year, the confirmation statement will preferably set forth all executed trades which occurred during that quarter. Most preferably, where transactions have been conducted in connection with a limited brokerage account during a given quarterly period, finance system 4 will automatically generate a quarterly report of all activity transacted during that quarter.

Finance system 4 may also contain a journaling system 42 for tracking and moving proceeds and shares as a result of settlement of executed trades. The proceeds of settled transactions are transmitted to participant 10 via check, bank wire (U.S. and foreign), payment to an employer payroll system, transfer to the participant limited brokerage account, or transfer of proceeds to a full-service brokerage account outside of finance system 4.

Finance system 4 also may include a modeling function 46 (FIG. 1) that allows participant 10 to perform calculations to ascertain the effect of various scenarios on option and/or share value. For example, participant 10 can ascertain a current stock price and obtain an estimate of gains and withholding taxes. Moreover, participant 10 can perform "what if"

calculations including changes in stock price, taxes, rate of stock price growth and time (affecting vesting and expiration of stock options).

FIGS. 14-23 provide further illustrations of exemplary Web-based interfaces.

FIG. 14 illustrates an order entry display 370 that is presented to participant 10 to collect information for place order function 210 (FIG. 9). Display 370 includes for each grant: a grant selector 372, a grant date 374, an option price 376, exercisable shares 378 and a shares to be sold entry 380. In addition, order entry display 370 includes an order type entry 382 (e.g., limit, market, etc.), a price entry 384 (e.g., for a limit order), a duration entry 386 to delineate a duration for the order (e.g., good-till-cancel (GTC)), a proceeds entry 388 to direct finance system 4 where to distribute proceeds, and review order and clear order selections 390.

FIG. 15 illustrates a review order display 400 that may be provided, for example, by interface system 38. Review order display 400 includes a statement of the order 402 including type, limit price (if any), number of shares, grant number, grant date, option price, etc. Participant 10 may submit the order by selecting 'Submit Order' button 404.

FIG. 16 illustrates a cancel order display 410 that may be provided, via confirmation system 44. Cancel order display 410 may include a statement 412 including facts about the order, and cancellation options 414 such as 'full cancel' or 'cancel replace' with a 'new price' entry. Participant 10 may select to 'initiate cancellation' 416 or 'reset' 418 the cancellation order information.

FIG. 17 illustrates a grant information (detailed) display 420. Grant information display 420 provides detailed information regarding a grant, for example, grant number, grant date, grant price, option type, options granted, options exercised, options exercisable, exercise date, option price, shares exercised, sales price, commissions, cost of grant, etc.

FIG. 18 illustrates a trade summary display 424 that provides detailed information regarding any number of trades including cancel order status, sequence number, entry date, quantity, status, order type, price, execution date, etc. FIG. 19 illustrates a detailed trade summary display 426 of one of the orders displayed on trade summary display 424 of FIG. 18. Exemplary features of the detailed trade summary display 426 include sequence number, order date, order time, status, order type, open quantity, price, cumulative executed, and the like.

FIG. 20 illustrates an order confirmation display 430 that provides detailed information regarding any order such as date submitted to trade system 12, reference number, etc. FIG. 21 illustrates a cancel order confirmation display 432 that provides detailed information regarding a canceled order including, for example, type of cancellation, type of order, order reference number, date placed, time placed, quantity price, limit price (if any), order expiration (if any), etc. From display 432, participant 10 may choose to confirm the order by selecting 'confirm' button 434 or cancel by selecting 'cancel' button 436. FIG. 22 illustrates an order cancellation display 440 created by confirmation system 44 to confirm cancellation of an order.

FIG. 23 illustrates an updating optionee (i.e., participant 10) information display 450 that may include fields for changing information regarding a participant 10 in a known fashion.

The present invention also includes a method for automatically processing transactions made pursuant to at least one of a stock option plan and a stock purchase plan, the method comprising the steps of storing participant information in a nonvolatile database 22 of an administration system 6; transmitting the participant information to a volatile data storage 32 of a finance system 4; implementing transactions with finance system 4; and transmitting updateable transaction information to the nonvolatile database 22 of the administration system 6.

Having thus described the invention in full detail, it will be recognized that such detail need not be strictly adhered to but that various changes and modifications may suggest themselves to one skilled in the art, all falling within the scope of the invention, as defined by the subjoined claims.

What is claimed is:

1. A system for inquiry and processing of trades made pursuant to a trading plan including at least one of a stock option plan and a stock purchase plan, the system comprising:
   a finance system for automatic processing of a transaction pursuant to at least one of the stock option plan and the stock purchase plan; and
   a communication system connected to the finance system for enabling a participant of the trading plan to input transaction information regarding a requested transaction in accordance with the trading plan,
   wherein the finance system includes:
      a volatile data storage for storing participant information, specific to the participant, pursuant to a data transfer from a nonvolatile database of a remote third party administration system;
      a first connection for accessing a quote server that provides real-time stock market quotes to the finance system;
      a monitoring system for ensuring proper function of the quote server by preventing inaccurate quotes from being provided to the participant;
      an interface system, connected to receive the participant information from the volatile data storage and quotes from the quote server in accordance with the monitoring system, for processing the requested transaction in accordance with the participant information; and
      a second connection to a trading system for conducting the processed requested transaction on a public exchange.

2. The system of claim 1, wherein the monitoring system makes a detection of when the connection for accessing the quote system fails to receive a quote for a predetermined amount of time, and determines whether a quote from the quote system is accurate or inaccurate in accordance with the detection.

3. The system of claim 2, wherein the predetermined amount of time is predetermined in accordance with dictates of the trading plan.

4. The system of claim 1, wherein said interface system processes requested stock option and purchase transactions to be conducted on one of a cash, cashless and stock swap basis.

5. The system of claim 1, wherein the finance system further includes a confirmation system connected for confirming execution of stock option and stock purchase contracts by the trading system.

6. The system of claim 1, wherein the communication system is selected from the group consisting of Internet, an interactive voice response system and an Intranet.

7. The system of claim 1, wherein distribution proceeds from a transaction are selected from the group consisting of transfer to participant account, wire, check, and payment though an employee payroll system.
   a confirmation system; and
   a journaling system.

8. A method for automatically processing transactions made pursuant to a trading plan including at least one of a stock option plan and a stock purchase plan, the method comprising the steps of:

inputting, to a volatile data storage of a finance system, participant information from a nonvolatile database of a remote third party administration system, the participant information being specific to a participant of the trading plan;

inputting, via a communication system accessible by the participant, transaction information regarding a requested transaction in accordance with the trading plan;

inputting to the finance system, from a quote server, real-time stock market quotes;

monitoring the quote server for ensuring proper function of the quote server by preventing inaccurate quotes from being transmitted to the participant;

inputting, to an interface system of the finance system, the participant information from the volatile data storage and quotes in accordance with the monitoring step;

processing, by the interface system, the requested transaction in accordance with the participant information; and conducting, via a trading system connected to the finance system, the processed requested transaction on a public exchange.

9. The method of claim 8, wherein the monitoring step makes a detection of when the connection for accessing the quote system fails to receive a quote for a predetermined amount of time, and determines whether a quote from the quote system is accurate or inaccurate in accordance with the detection.

10. The method of claim 9, wherein the predetermined amount of time is predetermined in accordance with dictates of the trading plan.

11. The method of claim 8, further comprising transmitting updateable transaction information to the nonvolatile database of the administration system.

12. The method of claim 8, wherein the processing step processes requested stock option and purchase transactions to be conducted on one of a cash, cashless and stock swap basis.

13. The method of claim 8, further including the step of confirming, by a confirmation system connected to the finance system, execution of stock option and stock purchase contracts by the trading system.

14. The method of claim 8, wherein the communication system is selected from the group consisting of Internet, an interactive voice response system and an Intranet.

15. The method of claim 8, wherein distribution proceeds from a transaction are selected from the group consisting of transfer to participant account, wire, check, and payment through an employee payroll system.

* * * * *

UNITED STATES PATENT AND TRADEMARK OFFICE
CERTIFICATE OF CORRECTION

| | | |
|---|---|---|
| PATENT NO. | : 7,472,098 B2 | Page 1 of 1 |
| APPLICATION NO. | : 09/779114 | |
| DATED | : December 30, 2008 | |
| INVENTOR(S) | : Lawrence P. Shields et al. | |

It is certified that error appears in the above-identified patent and that said Letters Patent is hereby corrected as shown below:

In claim 7, Column 18, Lines 66 and 67, omit the words "a confirmation system; and a journaling system."

Signed and Sealed this

Seventh Day of April, 2009

JOHN DOLL
*Acting Director of the United States Patent and Trademark Office*